(12) United States Patent
Emura et al.

(10) Patent No.: US 8,485,060 B2
(45) Date of Patent: Jul. 16, 2013

(54) BICYCLE SHIFT OPERATING DEVICE

(75) Inventors: Atsuhiro Emura, Osaka (JP);
Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 299 days.

(21) Appl. No.: 13/116,122

(22) Filed: May 26, 2011

(65) Prior Publication Data

US 2012/0297912 A1 Nov. 29, 2012

(51) Int. Cl.
*B62K 25/02* (2006.01)

(52) U.S. Cl.
USPC .................. 74/473.14; 74/473.13; 74/501.6; 74/504

(58) Field of Classification Search
USPC ........... 74/473.13, 473.14, 491, 500.5, 501.6, 74/502.2, 504, 502.5, 502.6
See application file for complete search history.

(56) References Cited

U.S. PATENT DOCUMENTS

| | | | | |
|---|---|---|---|---|
| 4,132,296 | A * | 1/1979 | Evett | 192/217 |
| 5,257,683 | A * | 11/1993 | Romano | 192/217 |
| 5,400,675 | A | 3/1995 | Nagano | |
| 5,479,776 | A * | 1/1996 | Romano | 74/502.2 |
| 5,806,372 | A * | 9/1998 | Campagnolo | 74/473.14 |
| 6,725,740 | B2 * | 4/2004 | Dal Pra' | 74/502.2 |
| 7,080,723 | B2 | 7/2006 | Uno et al. | 192/217 |
| 7,152,497 | B2 * | 12/2006 | Sato et al. | 74/502.2 |
| 7,526,979 | B2 | 5/2009 | Tsumiyama | |
| 7,527,137 | B1 * | 5/2009 | Calendrille, Jr. | 192/217 |
| 7,665,384 | B2 * | 2/2010 | Sato et al. | 74/502.2 |
| 7,854,180 | B2 * | 12/2010 | Tetsuka | 74/473.12 |
| 7,895,914 | B2 * | 3/2011 | Righi et al. | 74/502.2 |
| RE43,074 | E * | 1/2012 | Shahana | 74/502.2 |
| RE43,501 | E * | 7/2012 | Dal Pra' | 192/217 |
| 8,272,293 | B2 * | 9/2012 | Miki et al. | 74/502.2 |
| 8,297,146 | B2 * | 10/2012 | Miki | 74/502.2 |
| 8,375,824 | B2 * | 2/2013 | Miki | 74/502.2 |
| 8,393,244 | B2 * | 3/2013 | Watarai | 74/502.2 |
| 2004/0005947 | A1 * | 1/2004 | Shahana et al. | 474/78 |
| 2006/0189423 | A1 | 8/2006 | Ichida et al. | |
| 2007/0012137 | A1 | 1/2007 | Dal Pra' | |
| 2008/0087126 | A1 | 4/2008 | Oda et al. | |
| 2009/0038427 | A1 | 2/2009 | Watarai | |

FOREIGN PATENT DOCUMENTS

| | | |
|---|---|---|
| EP | 0 585 473 A1 | 3/1994 |
| EP | 1 764 298 A1 | 3/2007 |

OTHER PUBLICATIONS

European Search Report of corresponding EP Application No. 11 19 4728.9 dated Aug. 28, 2012.

\* cited by examiner

*Primary Examiner* — David M Fenstermacher
(74) *Attorney, Agent, or Firm* — Global IP Counselors

(57) ABSTRACT

A bicycle shift operating device is provided for operating a shifting device to move a chain between two gears using a guiding portion. The bicycle shift operating device has an operating member, a moving member and a positioning mechanism. The positioning mechanism selectively maintains the moving member in a first position that locates the guiding portion to a first guiding position corresponding to the first gear, a second position that locates the guiding portion to a second guiding position corresponding to the second gear, and a third position that locates the guiding portion to a third guiding position corresponding to the second gear. The third guiding position is farther from the first guiding position than the second guiding position. The positioning mechanism moves the moving member from the first position to the second position in response to a single operation of the operating member.

22 Claims, 19 Drawing Sheets

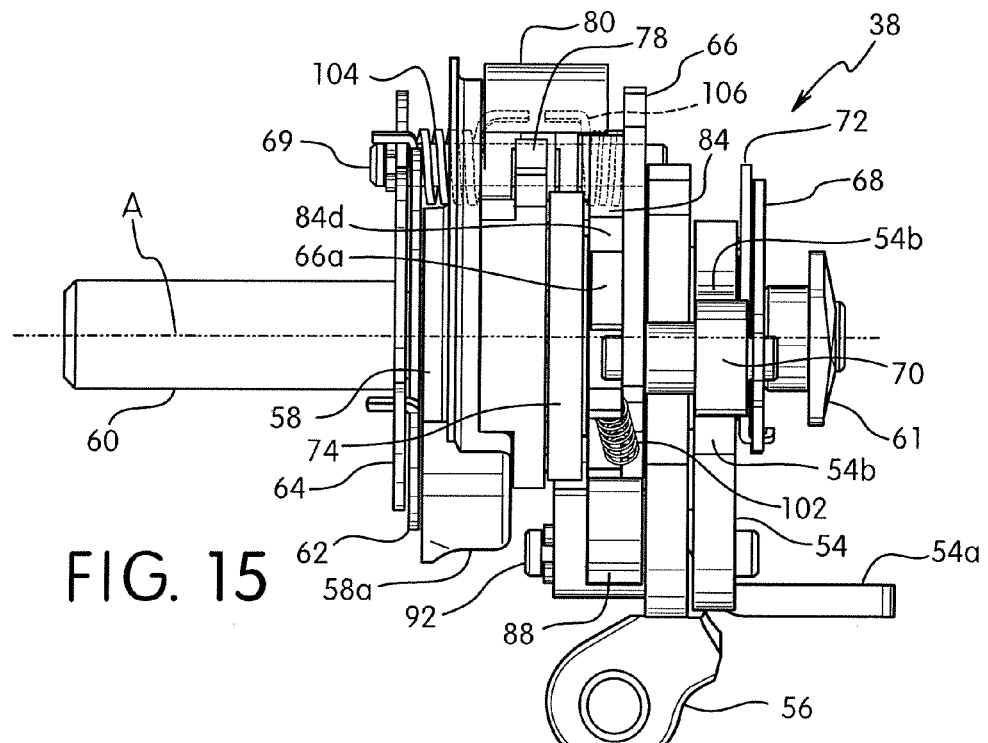
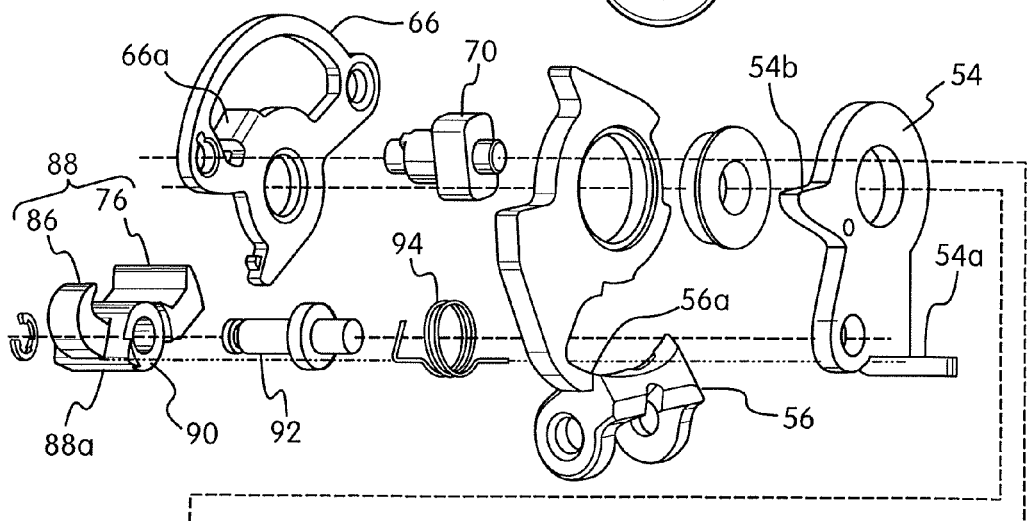
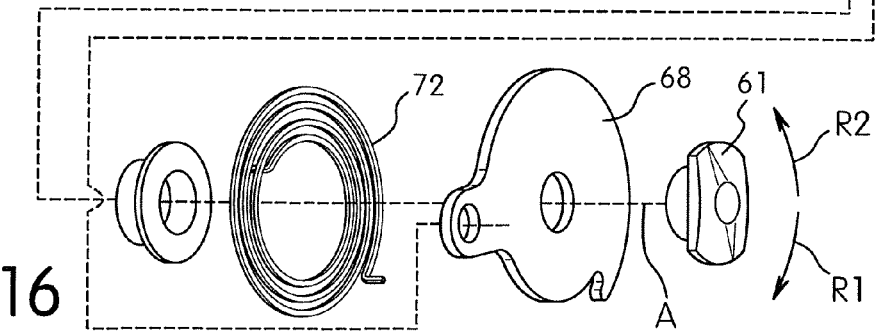
FIG. 15
FIG. 16

BICYCLE SHIFT OPERATING DEVICE

BACKGROUND

1. Field of the Invention

This invention generally relates to a bicycle shift operating device. More specifically, the present invention relates to a bicycle shift operating device that is operates a bicycle component using a control cable.

2. Background Information

Bicycle shift operating devices are used to shift gears of a multi-speed bicycle transmission. The multi-speed bicycle transmission typically includes a chain, one or more front sprockets or gears mounted to a front crankset and a plurality of rear sprockets or gears mounted to a rear hub of a rear wheel. The front and rear shift operating devices are designed to operate gear changing devices (e.g., a derailleur or an internal hub gear mechanism) to select a desired gear ratio. A pedaling force from the rider is transferred from the front sprockets to the rear sprockets via the chain for turning the rear wheel.

Most mechanical brake/shift operating devices use control cables that connects the brake/shift operating devices to the brake devices for braking and the gear changing devices for shifting. These control cables are typically Bowden type cables with an outer case and an inner wire. For shifting, a shift lever is usually used for operating the brake device. For example, the brake lever is also used as one of the shift lever for pulling the shift cable, while a separate lever is provided for releasing the shift cable. An operating force is typically applied by one of the rider's fingers to operate the shift levers, which in turn transmits the operating force to the shift cable via a shift operating unit. In many cases, the shift operating unit has a shift cable take-up spool. The inner wire of the shift cable is attached at one end to the cable take-up spool and its other end is attached to a part of a gear changing device such as a derailleur or an internal hub gear mechanism. The inner wire of the shift cable is wrapped (pulled) or unwrapped (released) about a peripheral edge of the shift cable take-up spool of the shift operating unit to pull and release the inner wire. By rotating the cable take-up spool, the inner wire slides within the outer case to pull or release the inner wire that operates the gear changing device. In the case of road shifters (e.g., brake/shift operating devices), the shift cable is typically routed along the handlebar. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

One aspect of the present disclosure is to provide a new bicycle shift operating device that permits a guiding portion to be moved directly from a first position to a second position without having to move first to a third position that is farther from the first position than the second position, where the first position locates the guiding portion to a first guiding position corresponding to a first gear and the second and third positions both locate the guiding portion to second and third guiding positions corresponding a second gear.

In view of the state of the known technology, a bicycle shift operating device is disclosed for operating a shifting device that selectively moves a chain between a first gear having a first diameter and a second gear having a second diameter that is smaller than the first diameter of the first gear using a guiding portion. The bicycle shift operating device basically comprises an operating member, a moving member and a positioning mechanism. The moving member is configured to be connected to the shifting device by a connecting member. The positioning mechanism selectively maintains the moving member in any one of a first position that locates the guiding portion to a first guiding position where the chain corresponds to the first gear, a second position that locates the guiding portion to a second guiding position where the chain corresponds to the second gear, and a third position that locates the guiding portion to a third guiding position where the chain corresponds to the second gear, the third guiding position being farther from the first guiding position than the second guiding position. The positioning mechanism is configured such that the moving member moves from the first position to the second position in response to a single operation of the operating member.

Various objects, features, aspects and advantages of the present disclosure will become apparent to those skilled in the art from the following detailed description, which, taken in conjunction with the annexed drawings, discloses one embodiment of a bicycle shift operating device.

BRIEF DESCRIPTION OF THE DRAWINGS

Referring now to the attached drawings which form a part of this original disclosure:

FIG. 15 is an enlarged outside elevational view of the shift operating unit of the right hand side shift operating device;

FIG. 16 is an exploded perspective view of selected parts of the shift operating unit of the right hand side shift operating device;

DETAILED DESCRIPTION OF EMBODIMENTS

Figure 1:
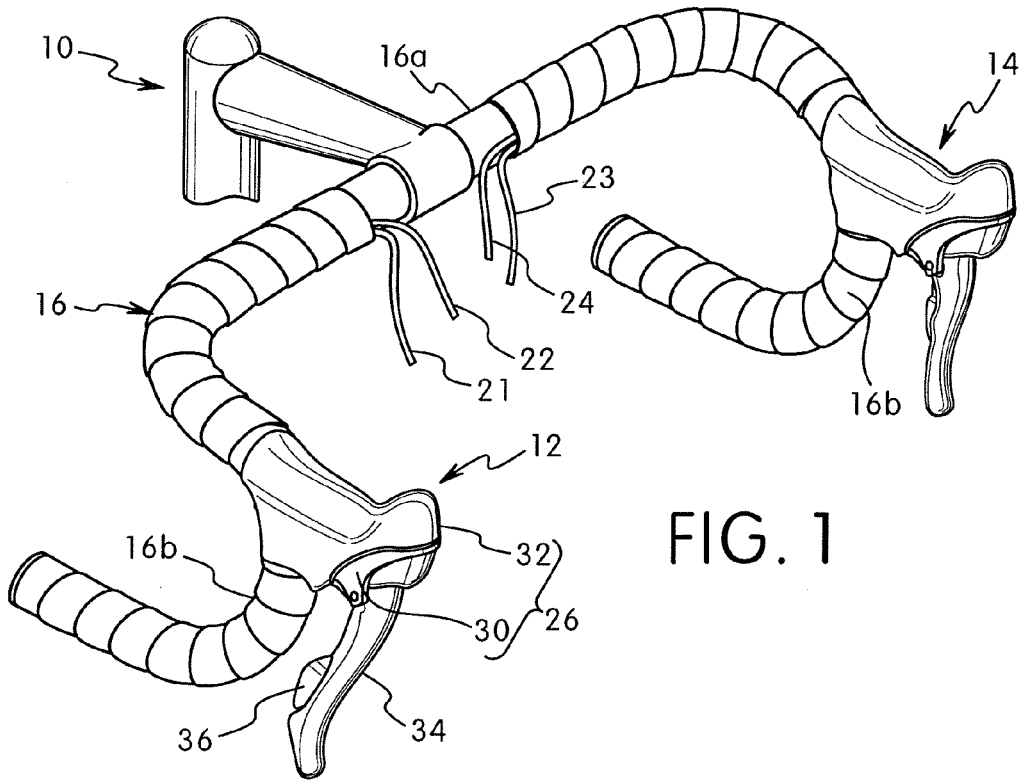
FIG. 1 is a front perspective view of a portion of a bicycle equipped with a pair of bicycle shift operating devices coupled to a drop type handlebar in their installed positions in accordance with a first embodiment.
Figure 2:
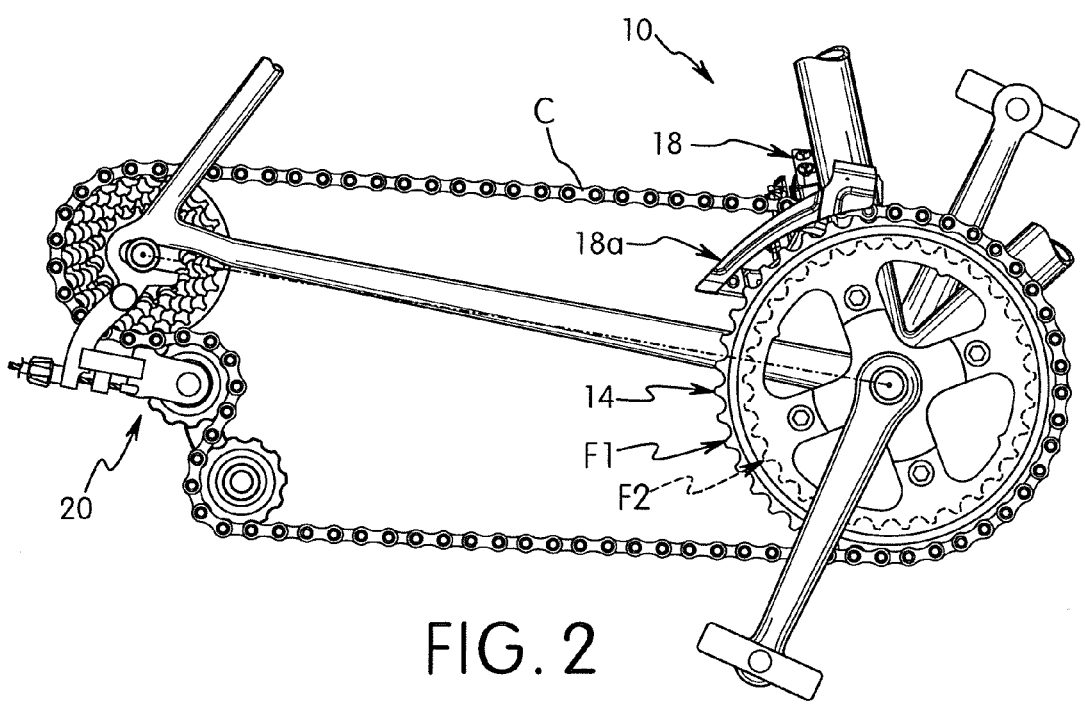
FIG. 2 is a side elevational view of a portion of a bicycle drive train that is operated by the bicycle shift operating devices illustrated in FIG. 1.

Referring initially to FIGS. 1 and 2, a bicycle driving system of a bicycle 10 that is equipped with a pair of bicycle shift operating devices 12 and 14 is illustrated. The bicycle shift operating devices 12 and 14 are mounted on a drop down handlebar 16 in accordance with the illustrated embodiments as seen in FIG. 1. The bicycle shift operating device 12 is a right hand side control device operated by the rider's right hand to operate a first brake device (not shown) and a first gear shifting device 18 (e.g., a cable operated front derailleur) as shown in FIG. 2. The bicycle shift operating device 14 is a left hand side control device operated by the rider's left hand to operate a second brake device (not shown) and a second gear shifting device 20 (e.g., a cable operated rear derailleur) as shown in FIG. 2. The first and second gear shifting devices 18 and 20 are part of the bicycle driving system that is used to shift a bicycle chain C for changing speeds of the drive train in a relatively conventional manner. In the illustrated embodiment, the bicycle shift operating device 12 is operatively coupled to the first gear shifting device 18 via a shift control cable 21 and the first brake device (not shown) via a brake control cable 22. The bicycle shift operating device 14 is operatively coupled to the second gear changing device 20 via a shift control cable 23 and the second brake device (not shown) via a brake control cable 24.

Figure 3:
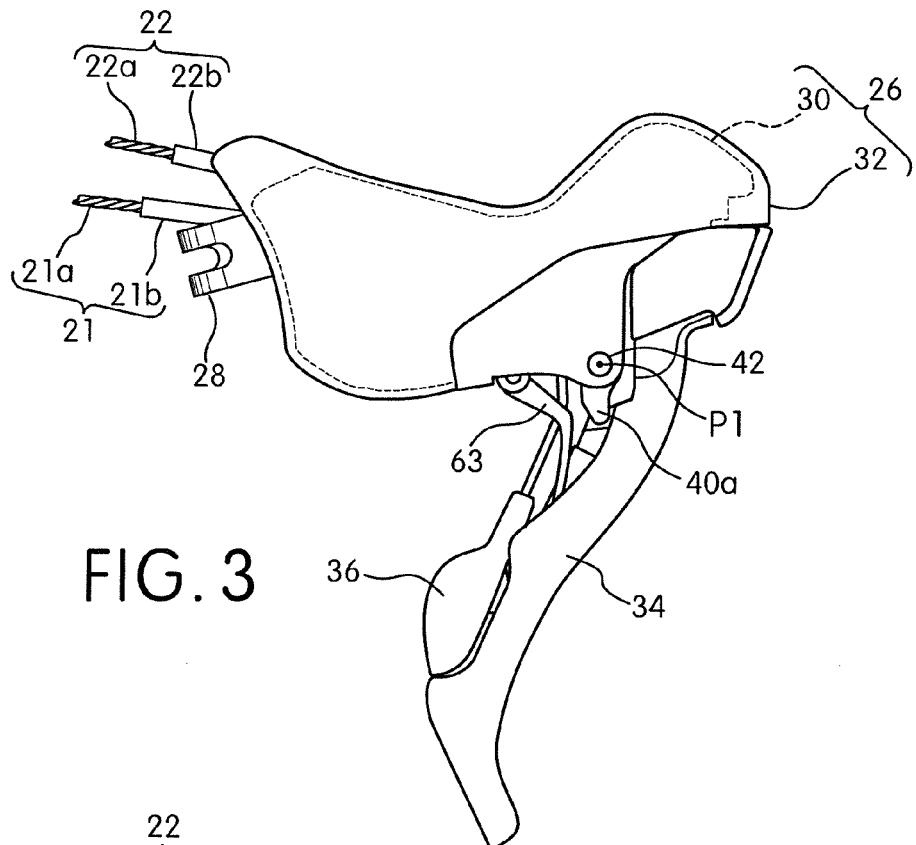
FIG. 3 is an outside elevational view of the right hand side shift operating devices illustrated in FIG. 1 with the brake/shift lever and the shift (release) lever in their rest positions.
Figure 4:
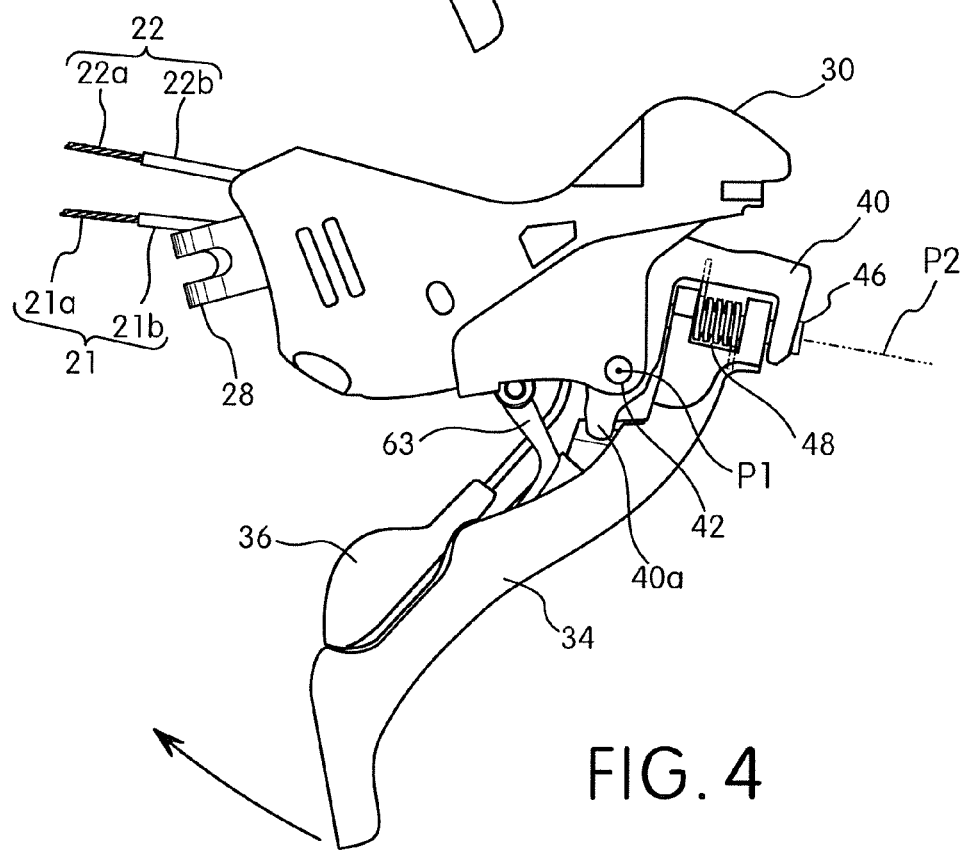
FIG. 4 is an outside elevational view of the right hand side shift operating device illustrated in FIG. 3 with the grip cover removed and the brake/shift lever pivoted to a braking position.

Preferably, the control cables 21 to 24 are conventional bicycle operating cables that have an outer case covering an inner wire. In other words, each of the control cables 21 to 24 are Bowden type cables basically include an inner wire slidably received within an outer case. For example, as seen in FIGS. 3 and 4, the shift control cable 21 has an inner wire 21a with an outer case 21b covering the inner wire 21a, while the brake control cable 22 has an inner wire 22a with an outer case 22b covering the inner wire 22a. The inner wire 21a constitutes a connecting member that operatively connects the bicycle shift operating device 12 to the first gear shifting device 18 for shifting the first gear shifting device 18 in response to operation of the bicycle shift operating device 12.

In the illustrated embodiment, the right and left hand side bicycle shift operating devices 12 and 14 are essentially identical in operation, except that they are mirror images of each other and they may have a different number of shift operations. In other words, the left hand side bicycle shift operating device 14 is substantially identical to the right hand side bicycle shift operating device 12, except for the shifting unit (not shown) of the left hand side bicycle shift operating device 14 has been modified to be a mirror image and to increase the number of gears that can be shifted. Thus, only the right hand side bicycle shift operating device 12 will be discussed and illustrated herein.

As seen in FIG. 1, normally, the gripping portions of the drop down handlebar 16 and portions of the control cables 21 and 22 are covered by the bar tape. The drop down handlebar 16 typically includes a straight cross portion 16a and a pair of downwardly curved portions 16b. The straight cross portion 16a connects upper ends of the downwardly curved portions 16b. The shift operating devices 12 and 14 are mounted to the downwardly curved portions 16b of the drop down handlebar 16. In the illustrated embodiment, the bicycle shift operating device 12 is mounted on the right hand side of the drop down handlebar 16 for operating the first gear shifting device 18 (e.g., a cable operated front derailleur) and the bicycle shift operating device 14 is mounted on the left hand side of the drop down handlebar 16 for operating the second gear shifting device 20 (e.g., a cable operated rear derailleur). However, each of the shift operating devices 12 and 14 can be manufactured as a mirror of the illustrated embodiment, such that the shift operating devices 12 and 14 can be mounted on opposite sides of the drop down handlebar 16.

As seen in FIGS. 3 and 4, the bicycle shift operating device 12 includes a bracket or base member 26 that is fixedly mounted to one of the curved portions 16b of the drop down handlebar 16 by a handlebar mounting structure 28. Since the bracket 26 is fixed to the drop down handlebar 16 by the handlebar mounting structure 28, the bracket 26 constitutes a fixed member. Riders sometimes grip the bracket 26 and lean on the bracket 26 during riding. It is desirable to provide a comfortable feeling for the rider's hand while the rider is gripping the bracket 26. Thus, the bracket 26 has a rigid main body 30 and a soft outer elastomeric grip cover 32. The grip cover 32 partially covers the main body 30 as seen in FIG. 3.

In particular, the grip cover 32 is stretched over a gripping portion of the main body 30. Typically, the main body 30 is made of a rigid plastic material. The bracket 26 is a stationary member when mounted to the handlebar 16. The handlebar mounting structure 28 is preferably a conventional band clamp or similar structure that is used in a road shifter for mounting to a drop down style handlebar such as the drop down handlebar 16. Thus, the handlebar mounting structure 28 will not be discussed in detail herein.

Figure 5:
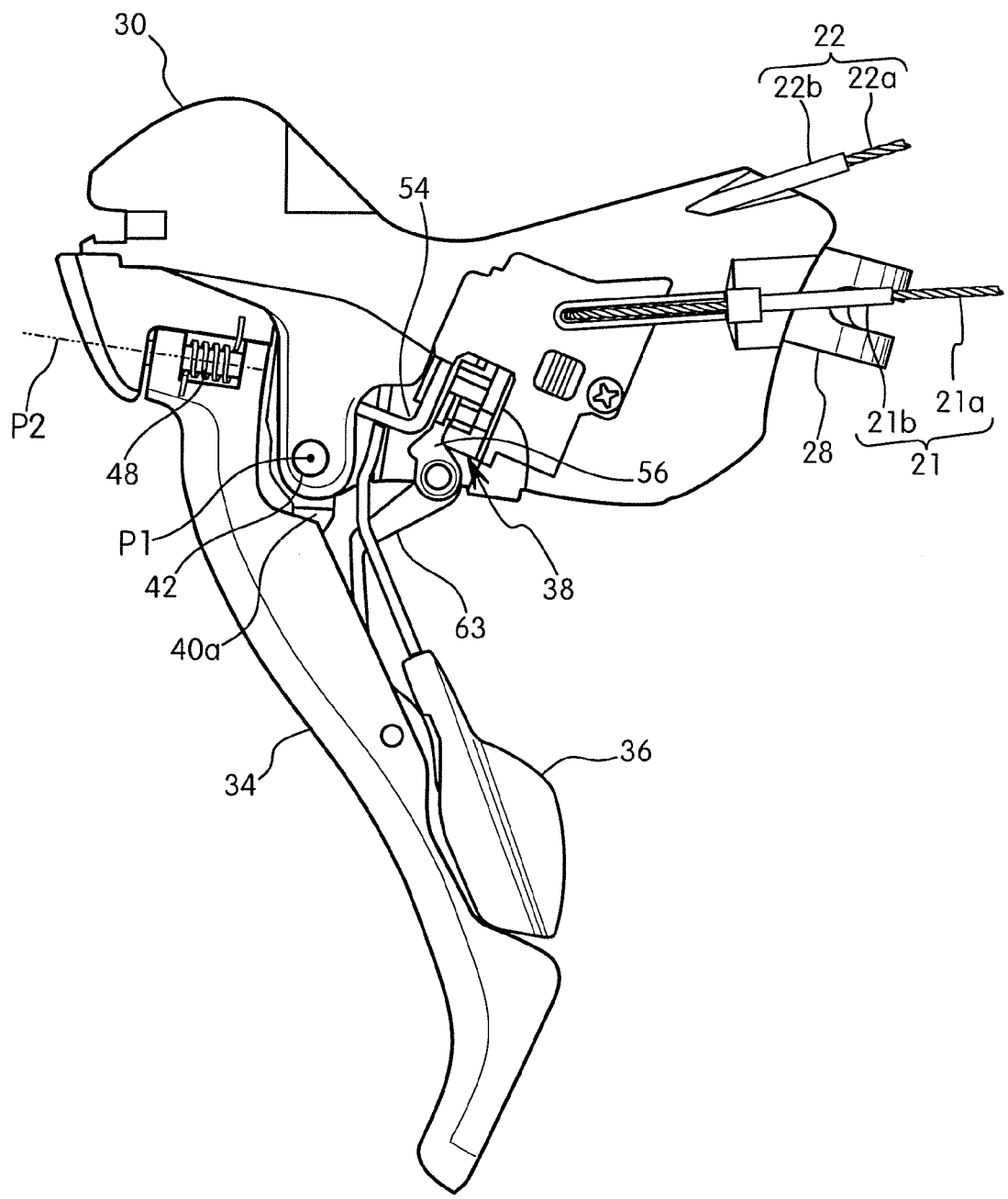
FIG. 5 is an inside elevational view of the right hand side shift operating device illustrated in FIGS. 3 and 4 with the grip cover removed and the brake/shift lever and the shift (release) lever in their rest positions.

In this embodiment, as best seen in FIG. 5, the bicycle shift operating device 12 further includes a brake/shift lever 34, a shift lever 36 and a shift operating unit 38. The main body 30 of the bracket 26 houses the shift operating unit 38 in an interior cavity of the main body 30. The brake/shift lever 34 and the shift lever 36 are examples of user operated levers used for operating the shift operating unit 38 as discussed below. The brake/shift lever 34 and the shift lever 36 are movable with respect to the bracket 26 to operate the shift operating unit 38.

The brake/shift lever 34 is used to perform both a braking operation and a shifting operation, while the shift lever 36 only performs a shifting operation. The brake/shift lever 34 and the shift lever 36 are operatively coupled to the shift operating unit 38 for performing shifting operations in the gear shifting device 18 to change gears (i.e., shifting the chain C between the gears F1 and F2). The brake/shift lever 34 and the shift lever 36 are preferably both pivoted relative to the main body 30 of the bracket 26 in a direction towards a bicycle longitudinal center plane for performing shifting operations.

As seen in FIG. 2, a conventional drive train of the bicycle 10 is illustrated that is operated by the first and second gear shifting devices 18 and 20. The first gear shifting device 18 is a conventional cable operated front derailleur that moves a bicycle chain C between a first or outer gear F1 having a first diameter and a second or inner gear F2 using a guiding portion 18a (i.e., a chain guide). The first or outer gear F1 is the largest front sprocket, and has a first diameter. The second or inner gear F2 is the smallest front sprocket, and has a second diameter that is smaller than the first diameter of the first or outer gear F1. The gears F1 and F2 form a gear assembly or crankset of the bicycle driving system. The second gear shifting device 20 is a conventional cable operated rear derailleur that moves the bicycle chain C between a plurality of rear gears R in a conventional manner. The first and second gear shifting devices 18 and 20 are not limited to being used with conventional cable operated derailleurs.

Figure 6:
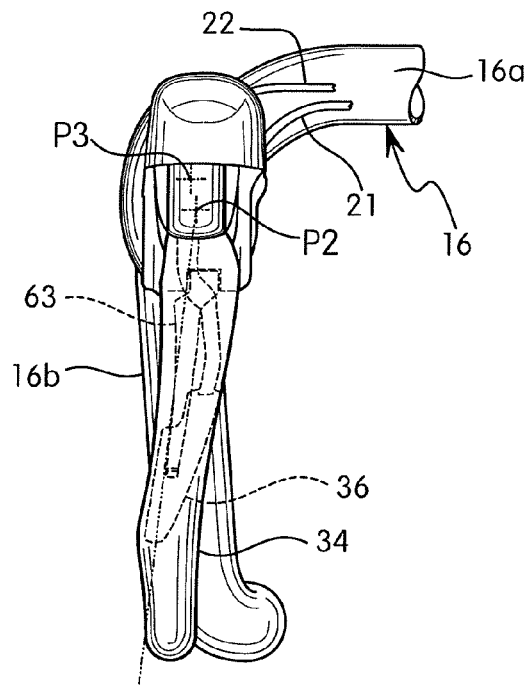
FIG. 6 is a front elevational view of the portion of the drop type handlebar and the right hand side shift operating device illustrated in FIGS. 3 to 5 with the brake/shift lever and the shift (release) lever in their rest positions.
Figure 7:
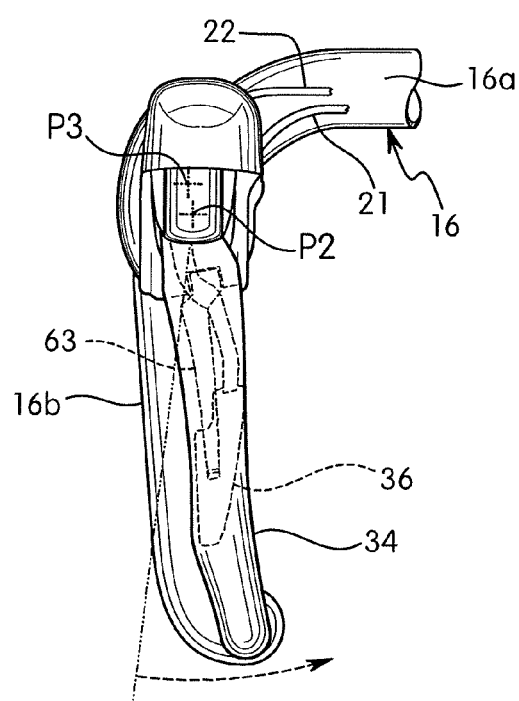
FIG. 7 is a front elevational view of the portion of the drop type handlebar and the right hand side shift operating device illustrated in FIG. 6 with the brake/shift lever of the right hand side shift operating device moved to a first cable pulling position.
Figure 8:
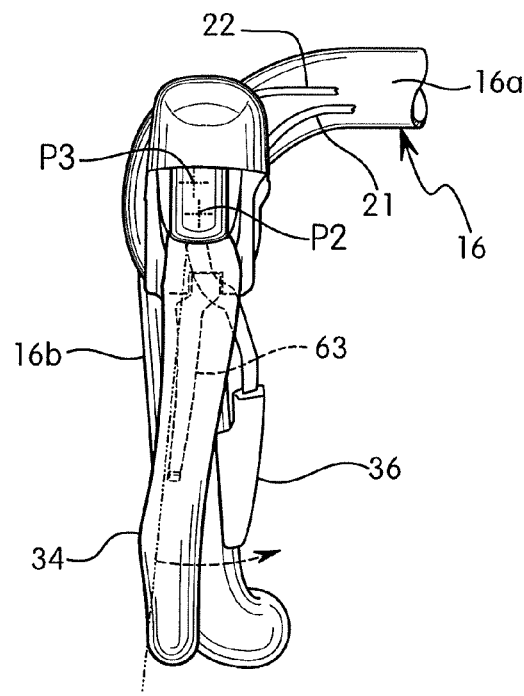
FIG. 8 is a front elevational view of the portion of the drop type handlebar and the right hand side shift operating device illustrated in FIGS. 6 and 7 with the shift (release) lever of the right hand side shift operating device moved to a cable releasing position.

Referring to FIGS. 6 to 8, shifting operations of the brake/shift lever 34 and the shift lever 36 are illustrated. The brake/shift lever 34 and the shift lever 36 are shown in their rest positions in FIG. 6. The term "rest position" as used herein refers to a state in which the part (e.g., the brake/shift lever 34 and the shift lever 36) remains stationary without the need of a user holding the part in that state corresponding to the rest position. The brake/shift lever 34 and the shift lever 36 are trigger type levers that are biased to the rest positions in a conventional manner. The brake/shift lever 34 functions as a brake lever. The brake/shift lever 34 pulls the inner wire 22a of the brake cable 22 by pivoting the brake/shift lever 34 about a brake pivot axis P1 relative to the main body 30 of the bracket 26 towards the curved portion 16b of the handlebar 16. The brake/shift lever 34 also functions as a cable pulling (winding) lever. The brake/shift lever 34 pulls the inner wire 21a of the shift cable 21 into the shift operating unit 38 by pivoting the brake/shift lever 34 about a shift pivot axis P2 relative to the main body 30 of the bracket 26 towards a center longitudinal plane of the bicycle 10. The shift lever 36 functions as a cable releasing lever. The shift lever 36 releases the inner wire 21a from the shift operating unit 38 by pivoting the shift lever 36 about a shift pivot axis P3 relative to the main body 30 of the bracket 26 towards the center longitudinal plane of the bicycle 10. In the illustrated embodiment, the shift lever 36 moves with the brake/shift lever 34 as the brake/shift lever 34 is moved to perform braking operations and shifting operations as discussed below. However, the brake/shift lever 34 generally remains stationary during movement of the shift lever 36 to perform shifting operations as discussed below.

Figure 9:
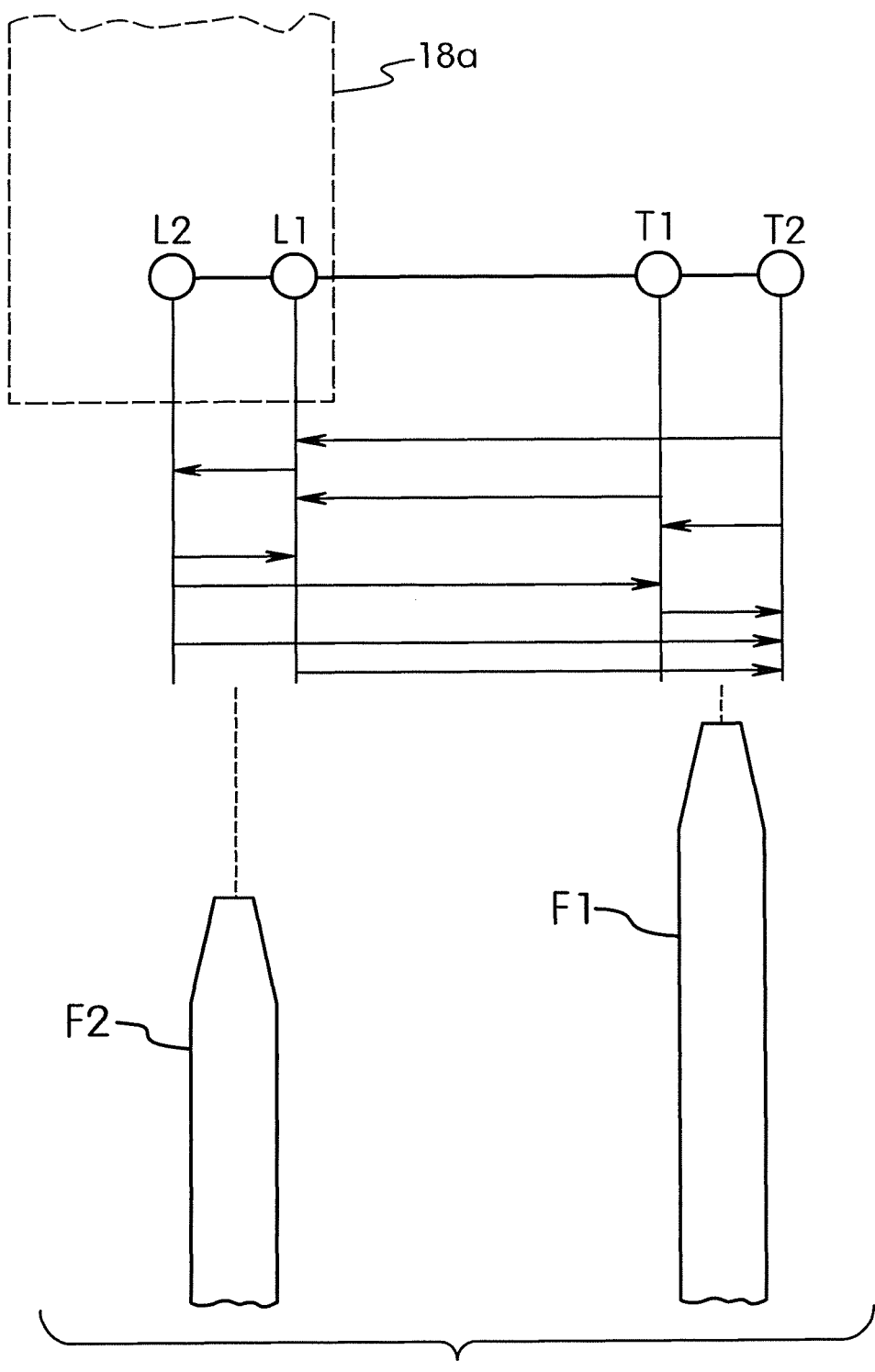
FIG. 9 is a schematic diagram illustrating various guiding positions for the chain guide of the front derailleur resulting by operating the right hand side shift operating device.

Referring to FIG. 9, a schematic diagram illustrates various positions of the guiding portion 18a of the gear shifting device 18 (e.g., the front derailleur) as a result of operation of the shift operating device 12. Basically, with the shift operating device 12, the chain guide 18a can be moved between the following four different guiding positions: a first low guiding position L1, a second low guiding position L2, a first top guiding position T1 and a second top guiding position T2. These four guiding positions L1, L2, T1 and T2 correspond to a longitudinal center of the guiding portion 18a that is halfway between the chain contact surfaces of the chain guide 18a. As seen in FIG. 9, the outer and inner gears F1 and F2 are axially spaced apart by a predetermined spacing or distance.

The first and second low guiding positions L1 and L2 are both used for maintaining the chain guide 18a of the gear shifting device 18 over the inner gear F2. The second low guiding position L2 corresponds to an innermost position of the chain guide 18a of the gear shifting device 18. The first and second top guiding positions T1 and T2 are both used for maintaining the chain guide 18a of the gear shifting device 18 over the outer gear F1. The second top guiding position T2 corresponds to an outermost position of the chain guide 18a of the gear shifting device 18. The first low guiding position L1 and the first top guiding position T1 correspond to first and second intermediate positions, respectively.

Using the shift operating device 12, the rider can shift the chain guide 18a directly from any one of the four guiding positions L1, L2, T1 and T2 to the immediately adjacent position(s) in a single progressive movement as diagrammatically illustrated in FIG. 9. Also when the rider shifts between the first and second low guiding positions L1 and L2, the chain C is not shifted to the outer gear F1 from the inner gear F2. Rather, when the rider shifts between the first and second low guiding positions L1 and L2, the chain C remains on the inner gear F2. Similarly, when the rider shifts between the first and second top guiding positions T1 and T2, the chain C is not shifted to the inner gear F2 from the outer gear F1. Rather, when the rider shifts between the first and second top guiding positions T1 and T2, the chain C remains on the outer gear F1.

As seen in FIG. 9, during cable releasing operations, the shift operating device 12 is configured such that the rider cannot shift the chain guide 18a directly to the second low guiding position L2 from either of the first and second top guiding positions T1 and T2 in a single progressive movement as diagrammatically illustrated in FIG. 9. Rather, during a cable releasing operation from either of the first and second top guiding positions T1 and T2 to the second low guiding position L2, the shift operating device 12 always stops at the first low guiding position L1. However, during a cable releasing operation, the rider can shift directly to the second low guiding positions L2 from the first low guiding position L1. In addition, during a cable releasing operation, the rider can shift directly to the first top guiding position T1 from the second top guiding position T2. Also, during a cable releasing operation from the second top guiding position T2 to the first low guiding position L1, the first top guiding position T1 can be bypassed (skipped) by the rider continuously operating the shift lever 36 in a single progressive movement.

On the other hand, as seen in FIG. 9, during a cable pulling operation, during a cable pulling operation, the rider can shift directly to any one of the other positions L1, T1 and T2 from the second low guiding position L2. Also, the rider can shift directly to the second top guiding position T2 from the second low guiding position L2. In other words, during a cable pulling operation from the second low guiding position L2 to the second top guiding position T2, the first low guiding position L1 and the first top guiding position T1 can both be bypassed (skipped) by the rider continuously operating the brake/shift lever 34 in a single progressive movement. Furthermore, during a cable pulling operation, the rider can shift directly to either of the first and second top guiding positions T1 and T2 from the first low guiding position L1. In other words, during a cable pulling operation from the first low guiding position L1 to the second top guiding position T2, the first top guiding position T1 can be bypassed (skipped) by the rider continuously operating the brake/shift lever 34 in a single progressive movement. Finally, during a cable pulling operation, the rider can shift directly to the second top guiding position T2 from the first top guiding position T1.

The first top guiding position T1 can be referred to as a first guiding position. The first low guiding position L1 can be referred to as a second guiding position. The second low guiding position L2 can be referred to as a third guiding position. The second top guiding position T2 can be referred to as a fourth guiding position. However, the use of first, second, third and fourth for the guiding positions should not be limited to any particular order unless specified. In such a case, the first and fourth guiding positions T1 and T2 are spaced apart by a distance that is smaller than a distance between the first and second guiding positions T1 and L1. Similarly, the second and third guiding positions L1 and L2 are spaced apart by a distance that is smaller than a distance between the first and second guiding positions T1 and L1. Typically, in most drive trains, the distance between the first and fourth guiding positions T1 and T2 is less than one-half of the distance between the first and second guiding positions T1 and L1. Likewise, in most drive trains, the distance between the second and third guiding positions L1 and L2 is less than one-half of the distance between the first and second guiding positions T1 and L1. The third guiding position L2 is farther from the first guiding position T1 than the second guiding position L1, and the fourth guiding position T2 is closer to the first guiding position T1 than the second guiding position L1. Also the fourth guiding position T2 is farther from the second guiding position L1 than the first guiding position T1.

Referring to FIGS. 4 and 10 to 12, a support member 40 is provided to support the brake/shift lever 34 and the shift lever 36 on the main body 30 of the bracket 26. The support member 40 is pivotally attached to the main body 30 of the bracket 26 by a pivot pin 42 that defines the brake pivot axis P1. A biasing element 44 is provided between the main body 30 and the support member 40. The biasing element 44 is arranged for biasing the support member 40 and the brake/shift lever 34 to a rest position as seen in FIG. 5. In the illustrated embodiment, the biasing element 44 is a torsion spring with its coiled portion disposed on the pivot pin 42 and its first and second free ends contacting the main body 30 and the support member 40, respectively.

Figure 10:
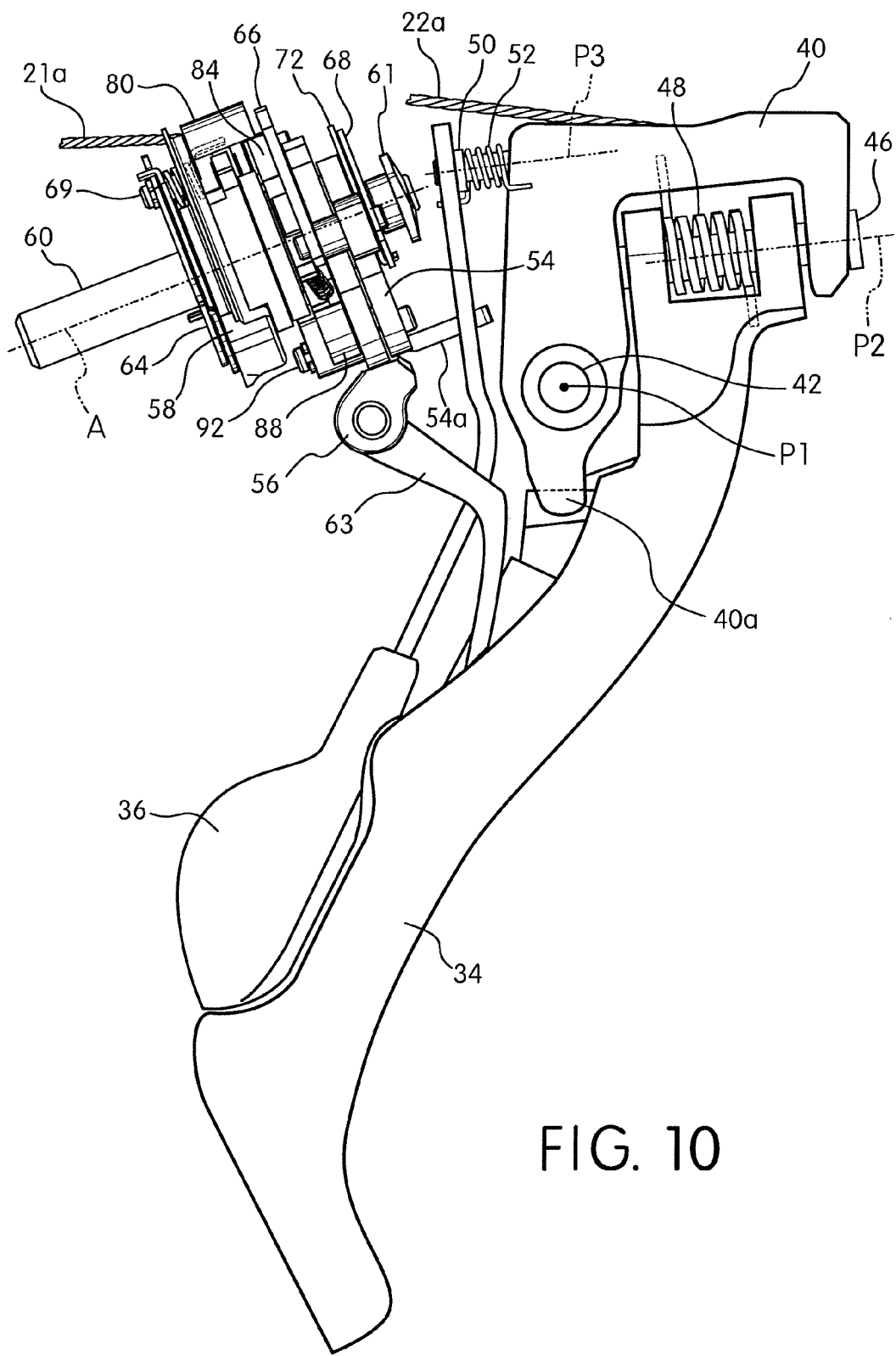
FIG. 10 is an outside elevational view of the shift operating unit of the right hand side shift operating device and the brake/shift lever and the shift (release) lever of the right hand side shift operating device in their rest positions.
Figure 11:
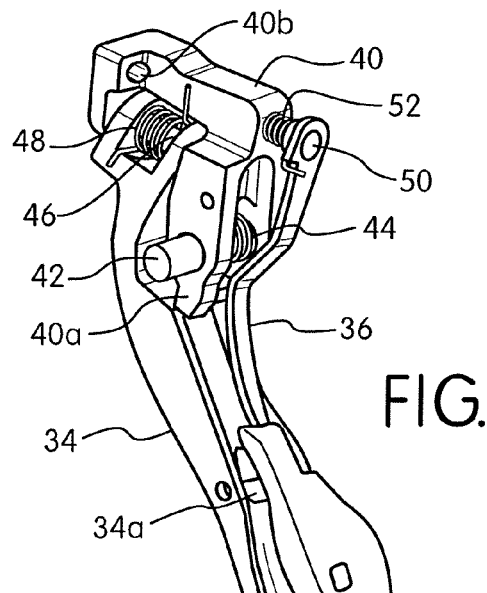
FIG. 11 is a rear side perspective view of the brake/shift lever and the shift (release) lever of the right hand side shift operating device.
Figure 12:
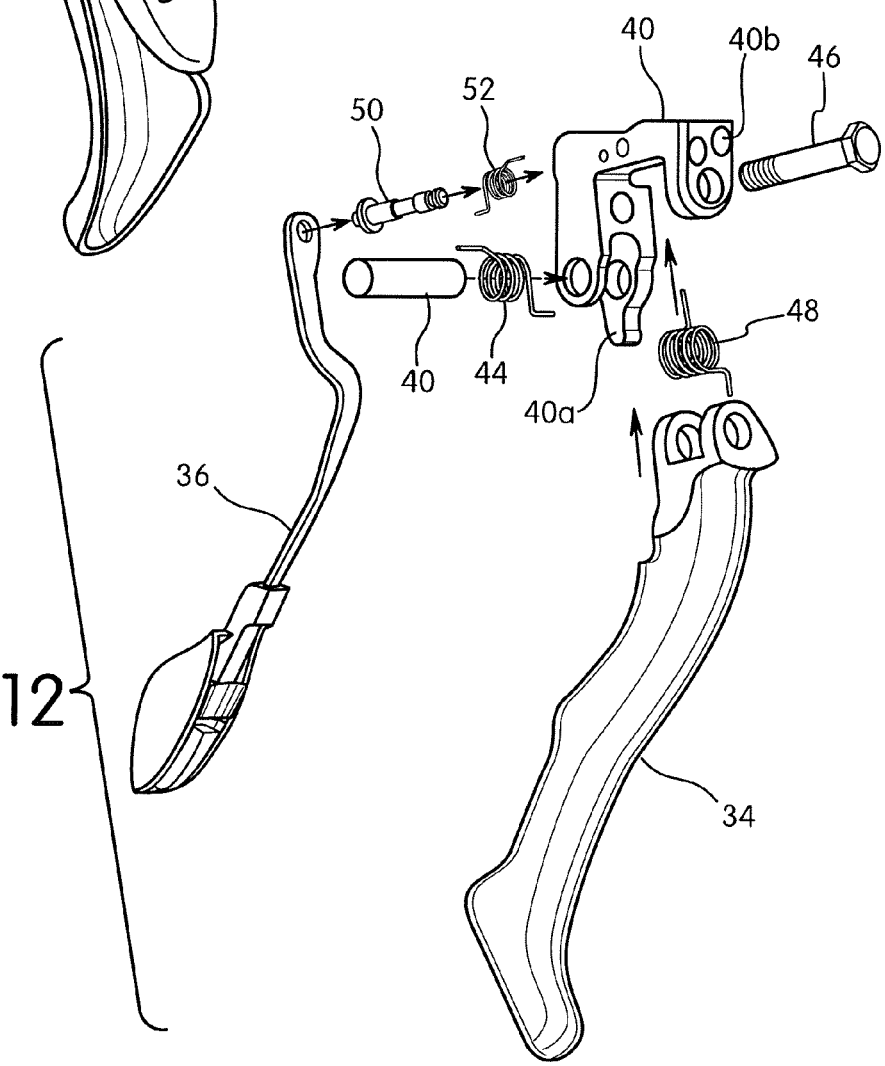
FIG. 12 is an exploded front side perspective view of the brake/shift lever and the shift (release) lever of the right hand side shift operating device.

As best seen in FIGS. 10 to 12, the brake/shift lever 34 is pivotally attached to the support member 40 by a pivot pin 46 that defines the shift pivot axis P2. A biasing element 48 is provided between the brake/shift lever 34 and the support member 40. The biasing element 48 is arranged for biasing the brake/shift lever 34 to a rest position against a tab 40a of the support member 40 as seen in FIGS. 4 and 5. In the illustrated embodiment, the biasing element 48 is a torsion spring with its coiled portion disposed on the pivot pin 46 and its first and second free ends contacting the brake/shift lever 34 and the support member 40, respectively.

As best seen in FIGS. 11 and 12, the support member 40 also includes a brake cable attachment structure 40b (e.g., a bore) for attaching the inner wire 22a. When the brake/shift lever 34 is pivoted about the brake pivot axis P1, the brake/shift lever 34 pulls the inner wire 22a relative to the outer case 22b to perform a braking operation. Generally speaking, in performing braking operations, the brake/shift lever 34 moves in a longitudinal direction with respect to the bracket 26. In other words, during a braking operation, the brake/shift lever 34 moves along a brake operating plane that is substantially perpendicular the shift operating planes of the brake/shift lever 34 and the shift lever 36. Thus, the brake/shift lever 34 moves with respect to the bracket 26 about the brake pivot axis P1 that is perpendicular to the shift pivot axes P2 and P3.

Referring to FIGS. 6 and 7, in performing a shifting (cable winding or pulling) operation with the brake/shift lever 34, the brake/shift lever 34 is moved (pivoted) laterally inward about the shift pivot axis P2 from the rest position (FIG. 6) to a cable winding position (FIG. 7) to perform a gear shift operation. In this illustrated embodiment, when the brake/shift lever 34 is moved to perform a shifting operation, the shift lever 36 moves with the brake/shift lever 34.

Referring to FIGS. 10 to 12, the shift lever 36 is also pivotally mounted to the support member 40 by a pivot pin 50 about the shift pivot axis P3. The shift pivot axis P3 can be either parallel to the shift pivot axis P2 or angled with respect to the shift pivot axis P2 as viewed in a direction parallel to the brake pivot axis P1. A biasing element 52 is provided between the brake/shift lever 34 and the support member 40 for biasing the shift lever 36 to a rest position. In the illustrated embodiment, the biasing element 52 is a torsion spring with its coiled portion disposed on the pivot pin 50 and its first and second free ends contacting the shift lever 36 and the support member 40, respectively.

In performing a shifting (releasing) operation with the shift lever 36, as seen in FIGS. 6 and 8, the shift lever 36 is moved laterally inward about the shift pivot axis P3 from the rest position (FIG. 6) to a cable releasing position (FIG. 8) to perform a gear shift operation. In this illustrated embodiment, when the shift lever 36 is moved to perform a shifting operation, the brake/shift lever 34 does not move with the shift lever 36. Rather during performing a shifting operation with the shift lever 36, the brake/shift lever 34 basically remains in its rest position due to the biasing force of the biasing element 48.

Generally speaking, in performing shifting operations, the brake/shift lever 34 and the shift lever 36 both move in a lateral direction with respect to the bracket 26 along shift operating planes to operate the shift operating unit 38. While in this illustrated embodiment, the shift pivot axes P2 and P3 are not coincident (offset), the shift pivot axes P2 and P3 could be made to be coincident if needed and/or desired. Moreover, the shift operating unit 38 can be operated in a variety of different ways, if needed and/or desired. For example, the shift operating unit 38 could be operated with buttons instead of levers.

Figure 13:
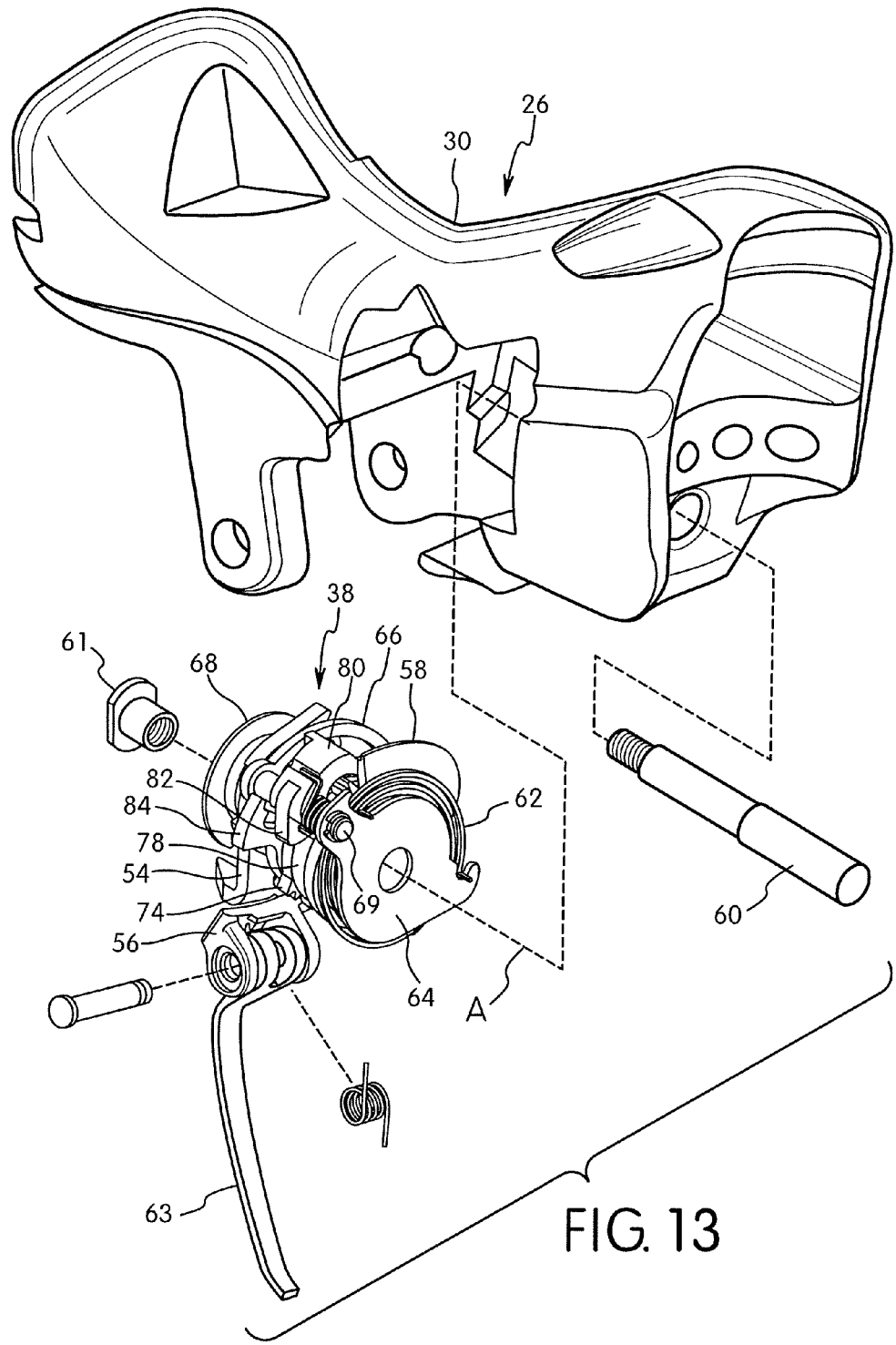
FIG. 13 is an exploded front side perspective view of the bracket and the shift operating unit of the right hand side shift operating device.
Figure 14:
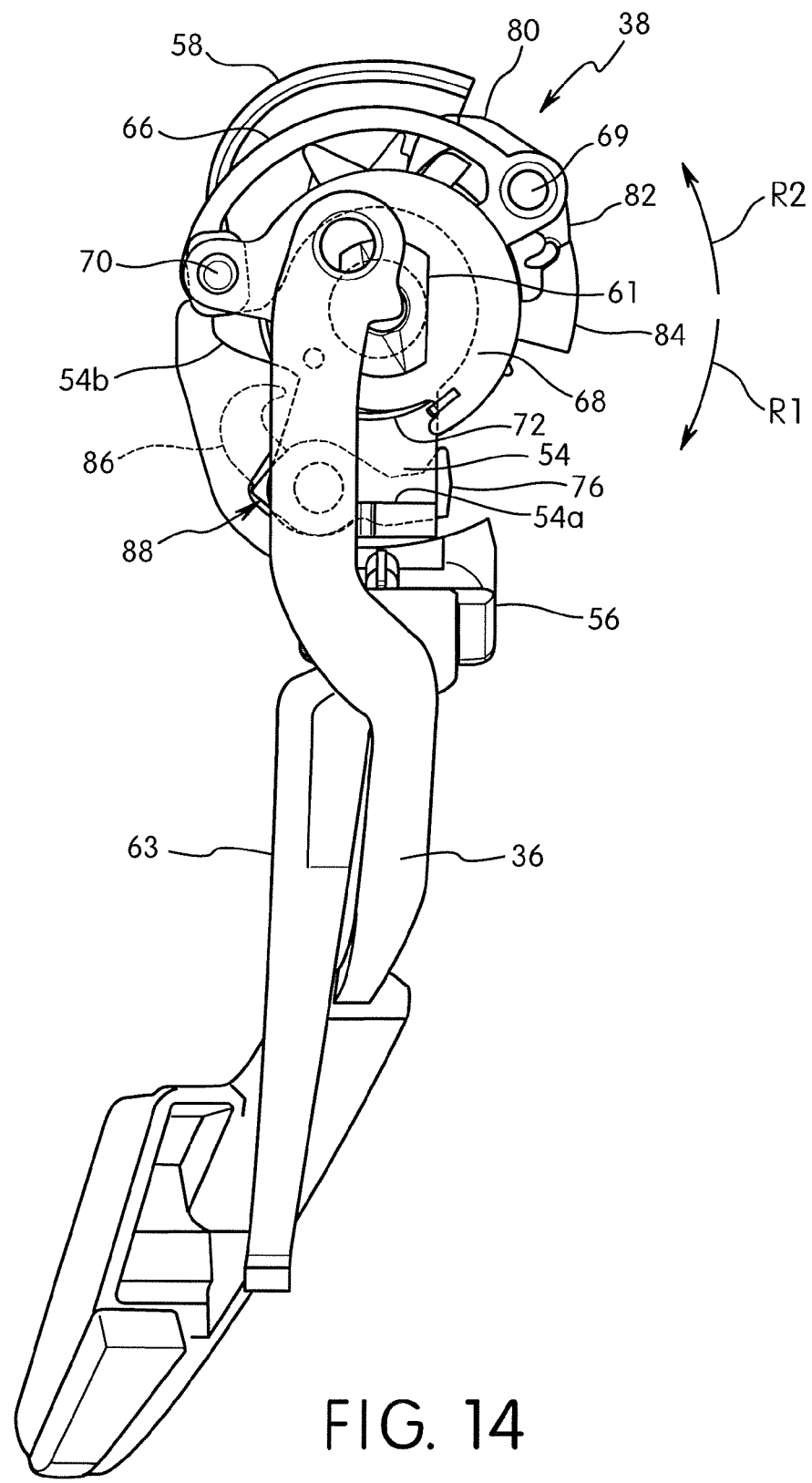
FIG. 14 is a front side perspective view of the shift operating unit and the shift (release) lever of the right hand side shift operating device as viewed along the center axis of main shift unit axle.
Figure 17:
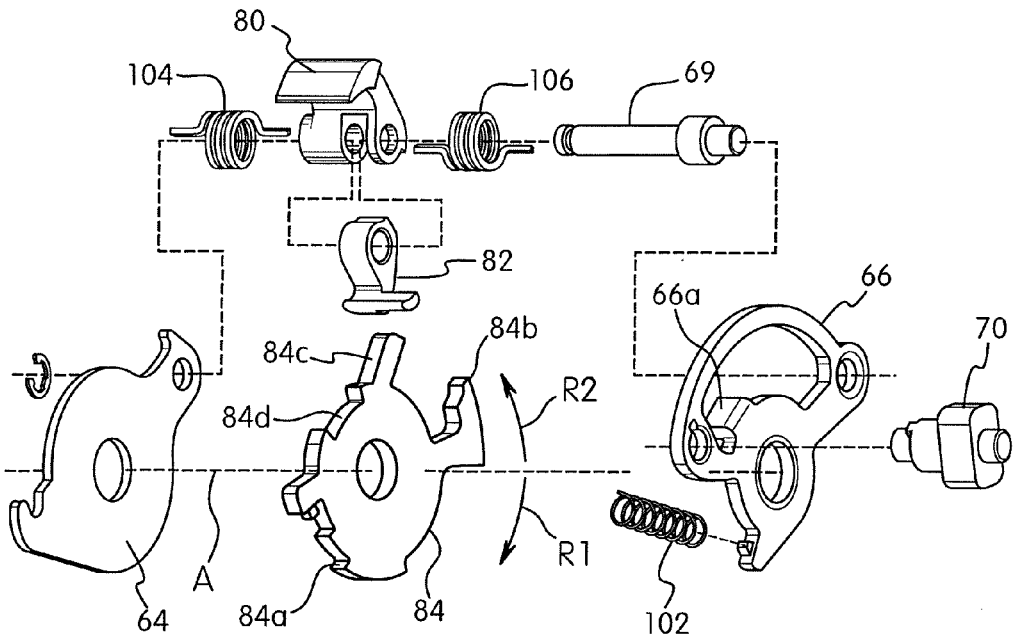
FIG. 17 is an exploded perspective view of selected parts of the shift operating unit of the right hand side shift operating device.

Turning now to FIGS. 13 to 18, the shift operating unit 38 will now be discussed. As seen in FIG. 13, the shift operating unit 38 is mounted on the main body 30. The shift operating unit 38 basically includes a first operating member 54, a second operating member 56 and a cable take-up member or spool 58. The take-up member 58 and the first and second operating members 54 and 56 are coaxially arranged on a main shift axle 60 of the shift operating unit 38. The main shift axle 60 defines a main pivot axis A of the shift operating unit 38. The main shift axle 60 pivotally supports the take-up member 58 and the first and second operating members 54 and 56 to the bracket 26 for rotation on the main pivot axis A (FIG. 15). In the illustrated embodiment, the main pivot axis A is angled with respect to the shift axes P2 and P3 as viewed in a direction parallel to the brake pivot axis P1. Basically, the take-up member 58 pivots in opposite rotational directions about the main pivot axis A in response to operation of the first and second operating members 54 and 56 as discussed below.

In the illustrated embodiment, the take-up member 58 is biased in a first rotational direction R1 by a biasing element 62. The take-up member 58 constitutes a wire winding body or moving member. The take-up member 58 is pivotally supported on the main shift axle 60 to pivot with respect to the bracket 26 in the first rotational direction R1 in response to the movement of the first operating member 54. Also the take-up member 58 is pivotally supported on the main shift axle 60 to pivot with respect to the bracket 26 (e.g., the fixed member) in a second rotational direction R2 in response to the movement of the second operating member 56. The first rotational direction R1 is an opposite rotational direction from the second rotational direction R2 with respect to the main pivot axis A.

Figure 18:
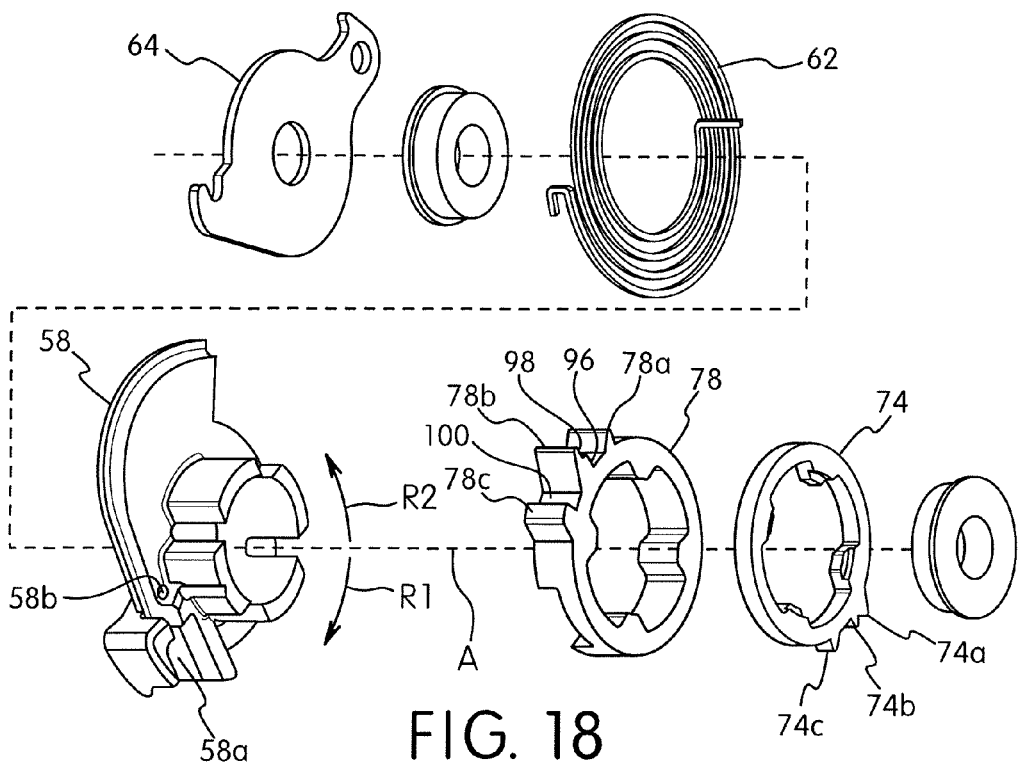
FIG. 18 is an exploded perspective view of selected parts of the shift operating unit of the right hand side shift operating device.

As best seen in FIG. 18, the take-up member 58 has a shift wire attachment structure 58a for attaching the inner wire 21a of the cable 21 thereto. Rotation of the take-up member 58 in the first rotational direction R1 results in the inner wire 21a of the cable 21 being unwound from the peripheral edge of the take-up member 58. Conversely, rotation of the take-up member 58 in the second rotational direction R2 results in the inner wire 21a of the cable 21 being wound on the peripheral edge of the take-up member 58.

Operation of the first operating member 54 causes the take-up member 58 to move in the first rotational direction R1 for releasing the inner wire 21a. The first operating member 54 is operated by the rider pivoting the shift lever 36 about the shift pivot axis P3. In particular, the first operating member 54 has a contact member or flange 54a that is contacted by the shift lever 36 such that the first operating member 54 is pivoted in response to pivotally movement of the shift lever 36. As a result, the shift lever 36 is operatively coupled to the shift operating unit 38 to perform a cable releasing operation of the take-up member 58. In the illustrated embodiment, the first operating member 54 is pivoted in the second rotational direction R2 with respect to the main pivot axis A of the take-up member 58 by the shift lever 36 to selectively operate the take-up member 58 in the first rotational direction R1. As explained below, the shift lever 36 and the first operating member 54 are biased in the first rotational direction R1 to their respective rest positions such that the shift lever 36 and the first operating member 54 return to their respective rest positions after the shift lever 36 is released.

On the other hand, operation of the second operating member 56 causes the take-up member 58 to move in the second rotational direction R2 for pulling the inner wire 21a. The second operating member 56 is operated by the rider pivoting the brake/shift lever 34 about the shift pivot axis P2. In particular, the second operating member 56 has a connecting member 63 (FIGS. 10, 13 and 14) that is contacted by the brake/shift lever 34 such that the second operating member 56 is pivoted in response to pivotally movement of the brake/shift lever 34. The connecting member 63 is pivotally mounted at one end to the second operating member 56 by a hinge connection and biased into slidably engagement with a rearward facing surface of the brake/shift lever 34 at the other end. As seen in FIG. 11, an attachment member 34a is provided on the rearward facing surface of the brake/shift lever 34 to slidably retain the lower end of the connecting member 63 to the brake/shift lever 34. Thus, the connecting member 63 can pivot in a rearward direction when the brake/shift lever 34 is pivoted in the rearward direction to perform a braking operation while the connecting member 63 still remains attached to the brake/shift lever 34. In this way, the connecting member 63 connects the brake/shift lever 34 to the shift operating unit 38. As a result, the brake/shift lever 34 is operatively coupled to the shift operating unit 38 to perform a cable pulling or winding operation of the take-up member 58.

In the illustrated embodiment, the second operating member 56 is pivoted in the second rotational direction R2 with respect to the main pivot axis A of the take-up member 58 by the brake/shift lever 34 to selectively operate the take-up member 58 in the second rotational direction R2. As explained below, the brake/shift lever 34 and the second operating member 56 are biased in the first rotational direction R1 to their respective rest positions such that the brake/shift lever 34 and the second operating member 56 return to their respective rest positions after the brake/shift lever 34 is released.

As seen in FIGS. 15 to 18, the shift operating unit 38 further includes a rear stationary plate 64, a middle stationary plate 66 and a front stationary plate 68. The stationary plates 64, 66 and 68 are rigid members that are all mounted on the main shift axle 60. The stationary plates 64, 66 and 68 are non-movable with respect to the main body 30 of the bracket 26. The rear stationary plate 64 is fixed to the middle stationary plate 66 by a pivot pin 69, while the front stationary plate 68 is fixed to the middle stationary plate 66 by a stop pin 70. Thus, the stationary plates 64, 66 and 68 are fixed together and contact the main body 30 of the bracket 26 such that the stationary plates 64, 66 and 68 are held stationary by the main body 30.

The rear stationary plate 64 provides an attachment point for the biasing element 62 of the take-up member 58. In particular, the biasing element 62 is a torsion spring that has a first end hooked on the rear stationary plate 64 and a second end coupled to the take-up member 58. Regarding the second end of the biasing element 62, the take-up member 58 has a hole 58b (FIG. 18) for receiving the second end of the biasing element 62. Thus, the biasing element 62 biases the take-up member 58 in the first rotational direction R1.

The stop pin 70 is mounted between the middle stationary plate 66 and the front stationary plate 68. The stop pin 70 acts as a stop for both of the first and second operating members 54 and 56. In particular, the stop pin 70 limits rotation of the first and second operating members 54 and 56 in the first rotational direction R1 to establish the rest positions of the first and second operating members 54 and 56. In the illustrated embodiment, the first operating member 54 is biased against the stop pin 70 by a biasing element 72, while the second operating member 56 is biased against the stop pin 70 by the biasing element 48 that is provided between the brake/shift lever 34 and the support member 40. Of course, it will be apparent from this disclosure that an additional biasing element can be provided for biasing second operating member 56 to its rest position. The biasing element 72 is provided between the front stationary plate 68 and the first operating member 54. As mentioned above, the biasing element 72 is arranged for biasing the first operating member 54 to its rest position against the stop pin 70. In the illustrated embodiment, the biasing element 72 is a torsion spring with its coiled portion disposed on the main shift axle 60 and its first and second free ends contacting the first operating member 54 and the front stationary plate 68, respectively.

Referring to FIGS. 15 to 18, the shift operating unit 38 further includes a pulling ratchet or plate 74, a pulling pawl 76, a positioning ratchet or plate 78, a positioning pawl 80, a stopping pawl 82, a release member or plate 84 and a release pawl 86. The positioning ratchet 78, the positioning pawl 80, the stopping pawl 82 and the release member 84 of the shift operating unit 38 constitutes a shift positioning mechanism that selectively maintains the take-up member 58 (e.g., the moving member) in any one of four different shift positions. Since the shift positions of the take-up member 58 correspond to guiding positions of the guiding portion 18a, the shift positions of the take-up member 58 and the guiding positions of the guiding portion 18a that correspond to each other will be referred to using the same term, i.e., shift positions will be referred to as guiding positions. In other words, the shift positions of the take-up member 58 includes a first low shift position that correspond to the first low guiding position L1 of the guiding portion 18a, a second low shift position that correspond to the second low guiding position L2 of the guiding portion 18a, a first top shift position that correspond to the first top guiding position T1 of the guiding portion 18a and a second top shift position the second top guiding position T2 of the guiding portion 18a.

Also, the shift or guiding positions (i.e., L1, L2, T1 and T2) of the take-up member 58 do not correspond to four different gears. Rather, the positioning mechanism (e.g., parts 78, 80, 82 and 84) is configured such that the first and second low guiding positions L1 and L2 correspond to a single gear (e.g., the inner gear F2), and such that the first and second top guiding positions T1 and T2 correspond to a single gear (e.g., the outer gear F1). More specifically, the distance (i.e., angular distance in the illustrated embodiment) between the first and second top guiding positions T1 and T2 of the take-up member 58 is smaller than the distance (i.e., angular distance in the illustrated embodiment) between the first top guiding position T1 and the first low guiding position L1. Similarly, the distance (i.e., angular distance in the illustrated embodiment) between the first and second low guiding positions L1 and L2 is smaller than the distance (i.e., angular distance in the illustrated embodiment) between the first top guiding position T1 and the first low guiding position L1. Typically, in most drive trains, the distance between the first and second top guiding positions T1 and T2 is less than one-half of the distance between the first top guiding position T1 and the first low guiding position L1. Likewise, in most drive trains, the distance between the first and second low guiding positions L1 and L2 is less than one-half of the distance between the first top guiding position T1 and the first low guiding position L1. The second low guiding position L2 is farther from the first top guiding position T1 than the first low guiding position L1, and the second top guiding position T2 is closer to the first top guiding T1 than the first low guiding position L1. Also the second top guiding position T2 is farther from the first low guiding position L1 than the first top guiding position T1.

The pulling ratchet 74, the positioning ratchet 78 and the release member 84 are coaxially arranged with the take-up member 58 on the main shift axle 60. The pulling ratchet 74 and the positioning ratchet 78 are arranged to rotate with the take-up member 58 on the main shift axle 60, while the release member 84 rotates relative to the take-up member 58 on the main shift axle 60. As explained below, the pulling pawl 76 selectively engages the pulling ratchet 74 to rotate the take-up member 58 on the main shift axle 60 in the second rotational direction R2 in response to operation of the second operating member 56. The positioning pawl 80 and the stopping pawl 82 selectively engage the positioning ratchet 78 to hold the take-up member 58 from rotating on the main shift axle 60 in the first rotational direction R1. The release pawl 86 selectively engages the release member 84 to rotate the release member 84 on the main shift axle 60 in the second rotational direction R2 in response to operation of the first operating member 54. Rotation of the release member 84 results in the release member 84 selectively moving such that the positioning pawl 80 and the stopping pawl 82 to selectively release the positioning ratchet 78.

In the illustrated embodiment, the pulling pawl 76 and the release pawl 86 are integrally formed as a one-piece, unitary pawl member 88. It will be apparent from this disclosure that the pulling pawl 76 and the release pawl 86 can be two pieces that are non-movably fixed together to form the pawl member 88, if needed and/or desired. The pawl member 88 is pivotally supported on the first operating member 54. The pawl member 88 includes a mounting portion 90 that is disposed between the pulling pawl 76 and the release pawl 86 such that the pulling pawl 76 and the release pawl 86 extend in opposite directions from the mounting portion 90. The mounting portion 90 of the pawl member 88 is pivotally mounted on the first operating member 54 by a pivot pin 92 such that the pawl member 88 moves with the first operating member 54. The pivot pin 92 defines a secondary pivot axis that is offset from the main pivot axis A.

A biasing element 94 is provided between the first operating member 54 and the pawl member 88 for biasing the pawl member 88. The pulling pawl 76 is biased away from the pulling ratchet 74 and the release pawl 86 is biased towards the release member 84. Thus, during a cable pulling operation of the shift operating unit 38, the release pawl 86 moves away from the release member 84 as the pulling pawl 76 moves into engagement with the pulling ratchet 74. In the illustrated embodiment, the biasing element 94 is a torsion spring with its coiled portion disposed on the pivot pin 92 and its first and second free ends contacting the first operating member 54 and the pawl member 88, respectively.

In the illustrated embodiment, the release pawl 86 contacts the release member 84 while the first and second operating members 54 and 56 are in their rest positions. However, alternatively, the release pawl 86 can be initially held out of contact with the release pawl 86 and then move into contact with the release member 84 after the first operating member 54 is operated.

The second operating member 56 includes a first abutment portion 56a that contacts a second abutment portion 88a of the pawl member 88 when the second operating member 56 is operated (i.e., pivoted from the rest position to a shifting position about the main pivot axis A). The second abutment portion 88a is formed on the mounting portion 90 of the pawl member 88. The second abutment portion 88a extends from the mounting portion 90 in the first rotational direction R1 with respect to the main pivot axis A of the take-up member 58. The first abutment portion 56a of the second operating member 56 acts as a first cam portion, while the second abutment portion 88a acts as a second cam portion.

The first abutment portion 56a of the second operating member 56 contacts the second abutment portion 88a of the pawl member 88 when the second operating member 56 is operated. As a result of the first abutment portion 56a of the second operating member 56 contacting the second abutment portion 88a of the pawl member 88, the pawl member 88 pivots on the pivot pin 92 against the biasing force of the biasing element 94 for engaging the pulling pawl 76 with the pulling ratchet 74. Also as a result of the first abutment portion 56a of the second operating member 56 contacting the second abutment portion 88a of the pawl member 88, the release pawl 86 moves away from the release member 84. Thus, operation of the second operating member 56 also results in the first operating member 54 and the pawl member 88 being moved with the second operating member 56. The contact between the first and second abutments 56a and 88a also causes the pulling pawl 76 to engage the pulling ratchet 74. Also as a result of the movement of operation of the second operating member 56, the take-up member 58, the pulling ratchet 74 and the positioning ratchet 78 are all rotated together about the main pivot axis A.

The pulling ratchet 74 will now be discussed now with respect to FIGS. 18 to 24. The pulling ratchet 74 is a rigid ring shaped member that is fixedly coupled to the take-up member 58 to pivot with the take-up member 58 on the main shift axle 60. In particular, the pulling ratchet 74 has a noncircular opening that mates with a corresponding noncircular hub of the take-up member 58. While the take-up member 58 and the pulling ratchet 74 are shown as separate members, it will be apparent from this disclosure that the take-up member 58 and the pulling ratchet 74 can be a one-piece, unitary member as needed and/or desired. In any event, the take-up member 58 and the pulling ratchet 74 are pivotally mounted as a unit on the main shift axle 60.

The pulling pawl 76 selectively engages and moves the pulling ratchet 74 response to the movement of the second operating member 56. In particular, the pulling ratchet 74 has a peripheral surface that is provided with a first pull tooth 74a, a second pull tooth 74b and a third pull tooth 74c. The pulling pawl 76 selectively engages the pull teeth 74a, 74b and 74c to rotate the pulling ratchet 74 in the second rotational direction R2, which results in the take-up member 58 also rotating in the second rotational direction R2.

Figure 19:
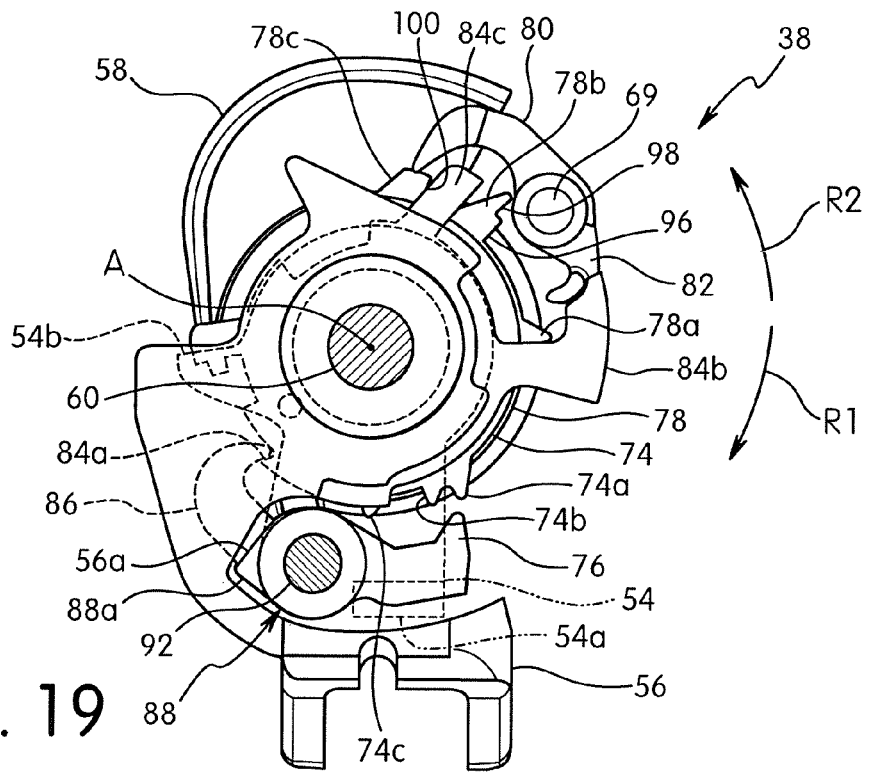
FIG. 19 is a front side view of selected parts of the shift operating unit as viewed along the center axis of the main shift unit axle, with the shift operating unit being in a fully released position such that the front derailleur is held in the second low guiding position (the innermost position) with the chain on the inner gear.

The positioning ratchet 78 will now be discussed in more detail. As best seen in FIGS. 18 and 19, the positioning ratchet 78 is a rigid ring shaped member that is fixedly coupled to the take-up member 58 to pivot with the take-up member 58 on the main shift axle 60. In other words, the positioning ratchet 78 constitutes a positioning member that rotates with the take-up member 58 (i.e., the moving member). In particular, in the illustrated embodiment, the positioning ratchet 78 has a noncircular opening that mates with a corresponding noncircular hub of the take-up member 58.

The positioning ratchet 78 includes a stop tooth 78a that forms an abutment or stop for selectively being engaged with a stopping tooth of the stopping pawl 82. More specifically, the stopping pawl 82 is moved into the path of the stop tooth 78a of the positioning ratchet 78 to selectively engage and stop movement of the positioning ratchet 78 in response to the movement of the first operating member 54. The stopping pawl 82 engages the stop tooth 78a of the positioning ratchet 78 during rotation of the positioning ratchet 78 in the first rotational direction R1 from the first top guiding position T1 to the first low guiding position L1 in response to a single operation of the first operating member 54 such that the positioning ratchet 78 and the take-up member 58 (i.e., the moving member) both momentarily stop in a position between the first top guiding position T1 and the first low guiding position L1.

The positioning ratchet 78 further includes a first positioning tooth 78b and a second positioning tooth 78c. The positioning pawl 80 selectively engages the first positioning tooth 78b while the take-up member 58 is in the first top guiding position T1 and the second top guiding position T2. The positioning pawl 80 selectively engages the second positioning tooth 78c while the take-up member 58 is in the first low guiding position L1 and the second low guiding position L2.

More specifically, in the illustrated embodiment, the first positioning tooth 78b forms a first stop surface 96 of the positioning ratchet 78 and a second stop surface 98 of the positioning ratchet 78. The second positioning tooth 78c forms a third stop surface 100 of the positioning ratchet 78. The stop surfaces 96, 98 and 100 are abutments for selectively being engaged with a positioning tooth of the positioning pawl 80.

When the positioning pawl 80 is engaged with the first stop surface 96 of the positioning ratchet 78, the positioning ratchet 78 maintains the take-up member 58 in the second top guiding position T2. When the positioning pawl 80 is engaged with the second stop surface 98 of the positioning ratchet 78, the positioning ratchet 78 maintains the take-up member 58 in the first top guiding position T1. When the positioning pawl 80 is engaged with the third stop surface 100 of the positioning ratchet 78, the positioning ratchet 78 maintains the take-up member 58 in the first low guiding position L1. When the positioning pawl 80 is contact the outer tip of the second positioning tooth 78c, the positioning ratchet 78 maintains the take-up member 58 in the second low guiding position L2 by the take-up member 58 contacting the main body 30 of the bracket 26. The distance (i.e., angular distance in the illustrated embodiment) between the first stop surface 96 and the second stop surface 98 is smaller than the distance (i.e., angular distance in the illustrated embodiment) between the second stop surface 98 and the third stop surface 100. Similarly, the distance (i.e., angular distance in the illustrated embodiment) between the third stop surface 100 and a point of the outer tip of the second positioning tooth 78c on which the positioning pawl being maintained is smaller than the distance (i.e., angular distance in the illustrated embodiment) between the second stop surface 98 and the third stop surface 100. With this arrangement, the second low guiding position L2 is farther from the first top guiding position T1 than the first low guiding position L1. Also with this arrangement, the second top guiding position T2 is closer to the first top guiding position T1 than the first low guiding position L1.

Figure 20:
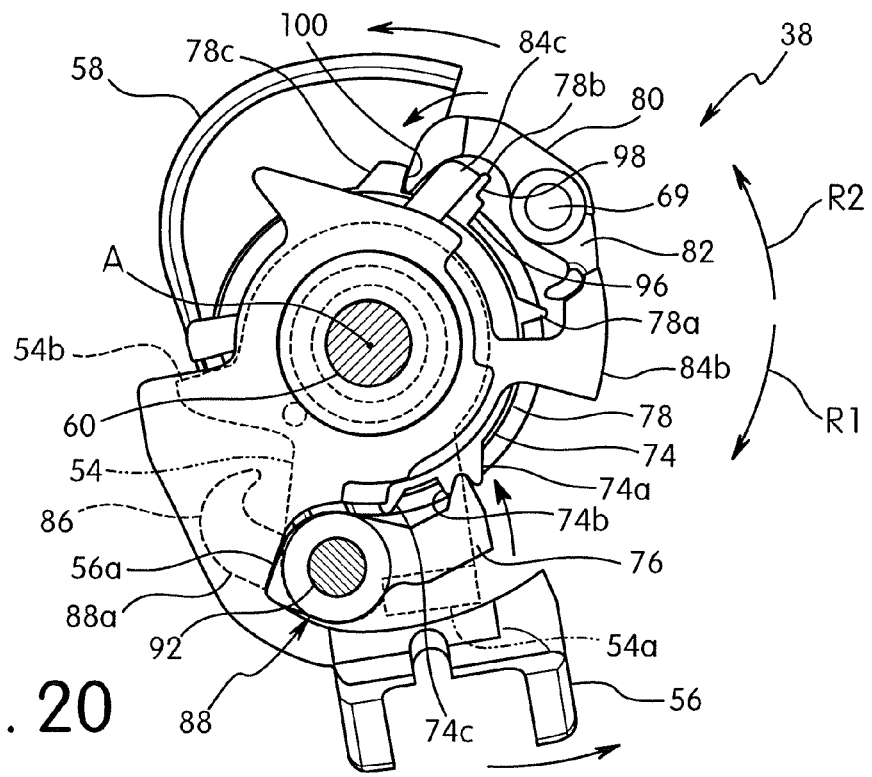
FIG. 20 is a front side view of the selected parts of the shift operating unit illustrated in FIG. 19, but with the pull operating member being rotated to pull the inner wire such that the front derailleur is moved to the first low guiding position (the first intermediate position) with the chain remaining on the inner gear.

The release member 84 will now be discussed in more detail. As best seen in FIGS. 18 and 20, the release member 84 is a rigid ring shaped member that is pivotally supported on the main shift axle 60. The release member 84 is not limited to a plate like member as illustrated. The release member 84 can have a different configuration as needed and/or desired. Thus, the release member 84 is a release member that selectively moves the positioning pawl 80 and the stopping pawl 82 to selectively release the positioning ratchet 78. In any case, in the illustrated embodiment, the release member 84 is configured and arranged to rotate relative to the take-up member 58 on the main shift axle 60. As mentioned above, the release member 84 is movably supported to operatively release the take-up member 58. The release member 84 is biased to a rest position by a biasing element 102. In the illustrated embodiment, the biasing element 102 is a coil spring that is preloaded in a slightly compressed state to bias the release member 84 to its rest position. Thus, the release member 84 is movably arranged between a non-releasing position that corresponds to the rest position and a releasing position that rotates the positioning pawl 80 and the stopping pawl 82.

The release member 84 includes an operating tooth 84a for selectively being engaged with the release pawl 86. More specifically, the release pawl 86 selectively engages the operating tooth 84a to move the release member 84 in response to the movement of the first operating member 54. This movement of the release member 84 moves the positioning pawl 80 and the stopping pawl 82 for controlling movement of the positioning ratchet 78. In particular, the release member 84 includes a first pawl operating projection 84b and a second pawl operating projection 84c for controlling movement of the positioning ratchet 78 such that the take-up member 58 is selectively maintained in the four shift or guiding positions L1, L2, T1 and T2. The release member 84 also includes a cutout 84d that receives a tab 66a of the middle stationary plate 66 for limiting rotation of the release member 84.

More specifically, the first pawl operating projection 84b is configured and arranged to pivot the stopping pawl 82 into the path of the stop tooth 78a to momentarily stop rotation of the positioning ratchet 78 in the first rotational direction R1 during a shifting (releasing) operation of the first operating member 54 from either of the first and second top guiding positions T1 and T2 to the first low guiding position L1. In other words, the first pawl operating projection 84b forms a first contact portion that contacts the stopping pawl 82 while the release member 84 is in the releasing position to pivot the stopping pawl 82 to catch the stop tooth 78a. As a result, when the take-up member 58 is released by the release member 84, the first pawl operating projection 84b pivots the stopping pawl 82 to catch the stop tooth 78a to momentarily stop rotation of the positioning ratchet 78 in the first rotational direction R1 during a shifting (releasing) operation by the first operating member 54. Thus, the take-up member 58 is moved from either of the first and second top guiding positions T1 and T2 to the first low guiding position L1.

The second pawl operating projection 84c is configured and arranged to pivot the positioning pawl 80 out of the paths of the first and second positioning teeth 78b and 78c. In other words, the second pawl operating projection 84c forms a second contact portion that contacts the positioning pawl 80 while the release member 84 is in the releasing position to pivot the positioning pawl 80 out of engagement with the first and second positioning teeth 78b and 78c. As a result of the positioning pawl 80 being pivoted outwardly from the positioning ratchet 78, the positioning ratchet 78 is released for pivotal movement in the first rotational direction R1 during a shifting (releasing) operation by the first operating member 54. Thus, the take-up member 58 can pivot to release a predetermined amount of the inner wire 21a.

The positioning pawl 80 and the stopping pawl 82 are separate members that are pivotally mounted on the pivot pin 69 for independent pivotal movement. Alternatively, a conventional pawl member can be used that includes both a positioning tooth and a stopping tooth. In the illustrated embodiment, the positioning pawl 80 and the stopping pawl 82 are pivoted by rotation of the release member 84 for selectively controlling the movement of the positioning ratchet 78 such that the take-up member 58 is selectively maintained in the four shift or guiding positions L1, L2, T1 and T2. As mentioned above, the pivot pin 69 is mounted to the stationary plates 64 and 66.

A first biasing element 104 is mounted on the pivot pin 69 for biasing the positioning pawl 80 into engagement with the positioning ratchet 78. In other words, the positioning pawl 80 is biased towards engagement with the positioning ratchet 78 such that the positioning tooth of the positioning pawl 80 contacts with the positioning ratchet 78 while the release member 84 is in the non-releasing position. A second biasing element 106 is mounted on the pivot pin 69 for biasing the stopping pawl 82 out of engagement with the positioning ratchet 78. The stopping pawl 82 is biased out of engagement with the positioning ratchet 78 such that the stopping tooth of stopping pawl 82 separates from the positioning ratchet 78 while the release member 84 is in the non-releasing position. Thus, the positioning pawl 80 and the stopping pawl 82 move independently with respect to each other. Also the pivot pin 69 defines a secondary pivot axis that is offset from the main pivot axis A. In the illustrated embodiment, the release member 84 rotates the positioning pawl 80 and the stopping pawl 82 such that the stopping tooth of the stopping pawl 82 starts to move from the non-stop position to the stop position prior to the positioning tooth of the positioning pawl 80 starting to move from the holding position to the non-holding position.

Basically, the positioning pawl 80 moves between a holding position and a non-holding position. In the holding position, the positioning pawl 80 holds the take-up member 58 from moving in the first rotational direction R1 by selectively engaging the first and second positioning teeth 78b and 78c. In the non-holding position, the positioning pawl 80a is disengaged from the first and second positioning teeth 78b and 78c by the release member 84.

Basically, the stopping pawl 82 selectively moves between a non-stop position and a stop position. In the non-stop (rest) position, the stopping pawl 82 is located out of the path of the stop tooth 78a of the positioning ratchet 78. In the stop position, the stopping pawl 82 is located along the path of the stop tooth 78a of the positioning ratchet 78 by the release member 84 to catch and hold the take-up member 58 from moving in the first rotational direction R1. The stopping tooth moves closer to the second rotational axis as the stopping pawl rotates from the unrestricting position to the stop position.

A cable pulling or winding operation of the shift operating unit 38 will now be discussed with reference primarily to FIGS. 19 to 25. Cable pulling operations of the shift operating unit 38 are performed by the rider pivotally moving the brake/shift lever 34 about the shift pivot axis P2 in the lateral inward direction towards the bicycle longitudinal center plane. The brake/shift lever 34 is operated in a single progressive movement such that in the second operating member 56 moves in a single progressive movement in the second rotational direction R2 from one of the four shift or guiding positions L1, L2, T1 and T2 to the next adjacent shift or guiding position. FIGS. 19, 21, 23 and 25 illustrate the second operating member 56 in its rest position. FIGS. 20, 22 and 24 illustrate the second operating member 56 in its shifting position.

As seen in FIG. 19, the shift operating unit 38 is in a fully released position such that the positioning pawl 80 is contacting the outer tip of the second positioning tooth 78c. In this position, the positioning ratchet 78 maintains the take-up member 58 in the second low guiding position L2 such that the first gear shifting device 18 is held in the second low guiding position L2 with the chain C on the inner gear F2.

As mentioned above, a cable pulling or winding operation of the shift operating unit 38 is performed by the rider pivotally moving the brake/shift lever 34. This pivotal movement of the brake/shift lever 34 is transmitted to the second operating member 56 via the connecting member 63 such that the second operating member 56 is rotated in the second rotational direction R2 from its rest position (FIG. 19) to its shifting position (FIG. 20). As the second operating member 56 rotates in the second rotational direction R2, the first abutment portion 56a of the second operating member 56 contacts the second abutment portion 88a of the pawl member 88 to pivot the pulling pawl 76 into engagement with the first pull tooth 74a of the pulling ratchet 74. This engagement of the pulling pawl 76 with the first pull tooth 74a causes the pulling ratchet 74 to rotate in the second rotational direction R2. Rotation of the pulling ratchet 74 also results in the take-up member 58 and the positioning ratchet 78 to rotate together. Thus, the rotation of the positioning ratchet 78 results in the positioning pawl 80 engaging the third stop surface 100 of the positioning ratchet 78 to hold the take-up member 58 in the first low guiding position L1.

Figure 21:
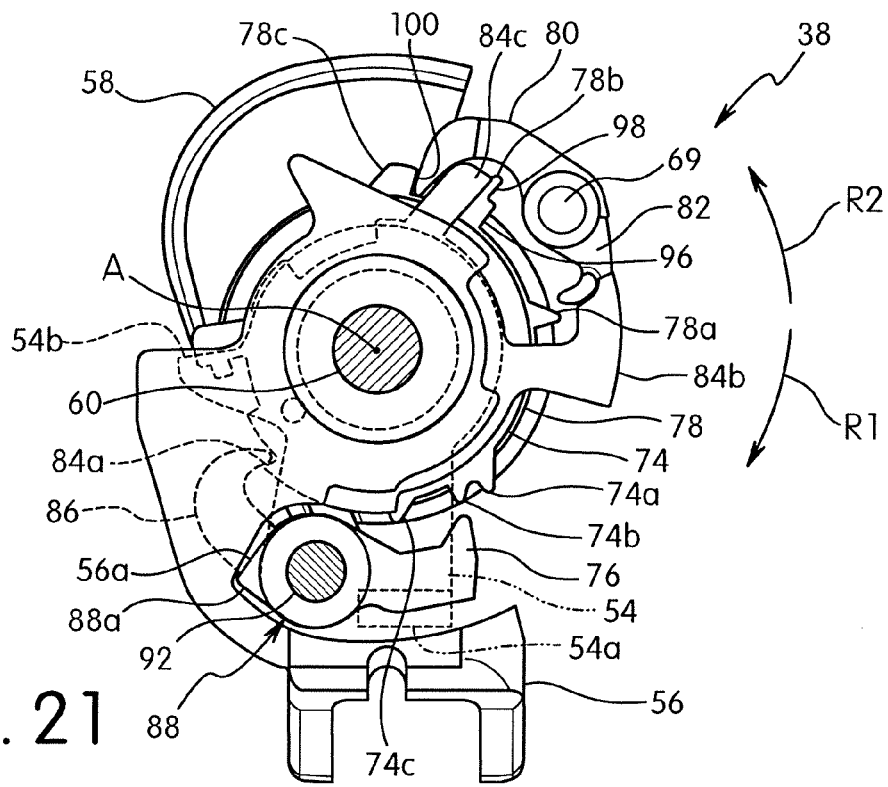
FIG. 21 is a front side view of the selected parts of the shift operating unit illustrated in FIGS. 19 and 20, but with the pull operating member being rotated from the shift operating position of FIG. 20 back to the rest position such that the front derailleur is held in the first low guiding position (the first intermediate position) with the chain remaining on the inner gear.
Figure 22:
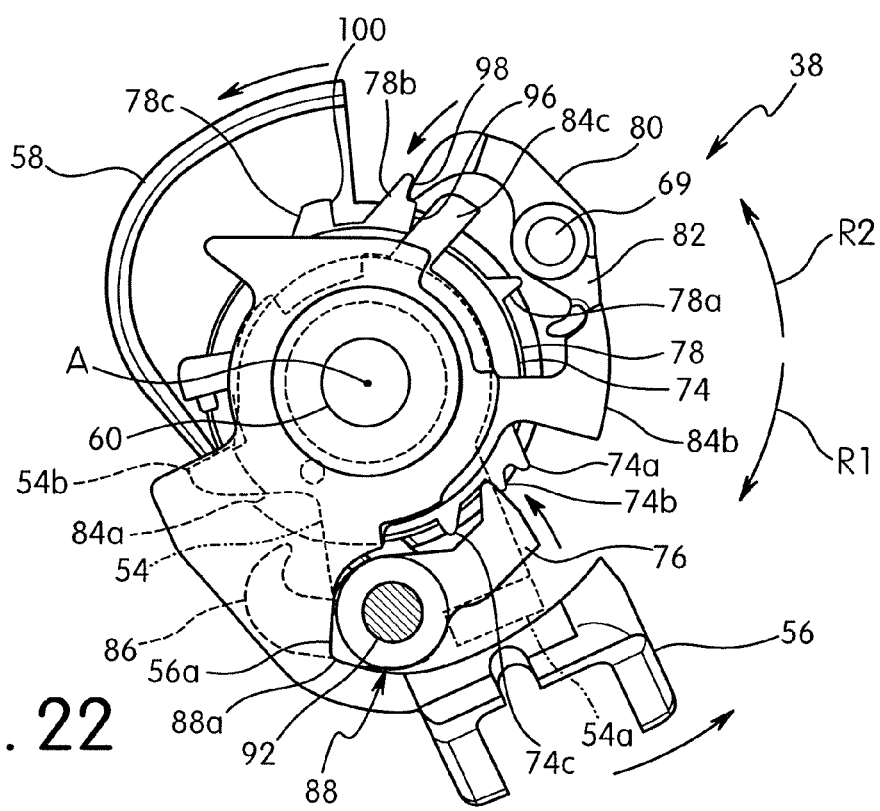
FIG. 22 is a front side view of the selected parts of the shift operating unit illustrated in FIGS. 19 to 21, but with the pull operating member being rotated to pull the inner wire such that the front derailleur is moved to the first top guiding position (the second intermediate position) with the chain being shifted to the outer gear.

When the brake/shift lever 34 is released from the shifting position of FIG. 20, the first and second operating members 54 and 56 return to their rest positions as seen in FIG. 21 and the positioning ratchet 78 is engaged with the positioning pawl 80 to maintain the take-up member 58 in the first low guiding position L1. Now, another winding operation of the shift operating unit 38 can be performed by the rider pivotally moving the brake/shift lever 34 about the shift pivot axis P2 in the lateral inward direction towards the bicycle longitudinal center plane. Again, this pivotal movement of the brake/shift lever 34 is transmitted to the second operating member 56 via the connecting member 63 such that the second operating member 56 is rotated in the second rotational direction R2 from its rest position (FIG. 21) to its shifting position (FIG. 22). As the second operating member 56 rotates in the second rotational direction R2, the first abutment portion 56a of the second operating member 56 again contacts the second abutment portion 88a of the pawl member 88 to pivot the pulling pawl 76 into engagement with the second pull tooth 74b of the pulling ratchet 74. This engagement of the pulling pawl 76 with the first pull tooth 74a causes the pulling ratchet 74 to rotate in the second rotational direction R2. Rotation of the pulling ratchet 74 also results in the take-up member 58 and the positioning ratchet 78 to rotate together. Thus, the rotation of the positioning ratchet 78 results in the positioning pawl 80 engaging the second stop surface 98 of the positioning ratchet 78 to hold the take-up member 58 in the first top guiding position T1.

Figure 23:
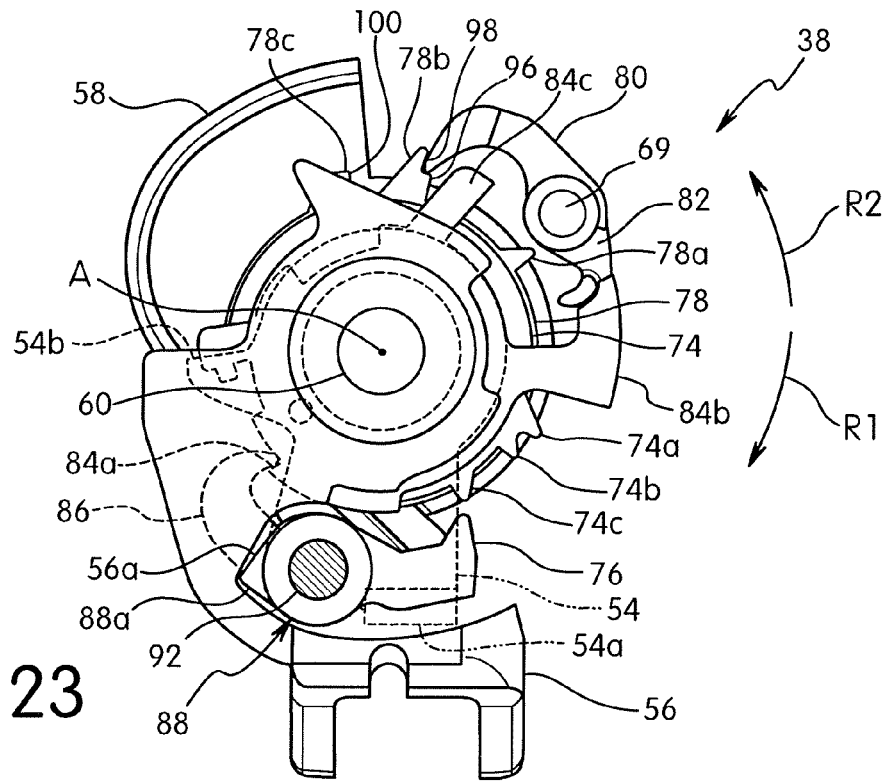
FIG. 23 is a front side view of the selected parts of the shift operating unit illustrated in FIGS. 19 to 22, but with the pull operating member being rotated from the shift operating position of FIG. 22 back to the rest position such that the front derailleur is held in the first top guiding position (the second intermediate position) with the chain remaining on the outer gear.
Figure 24:
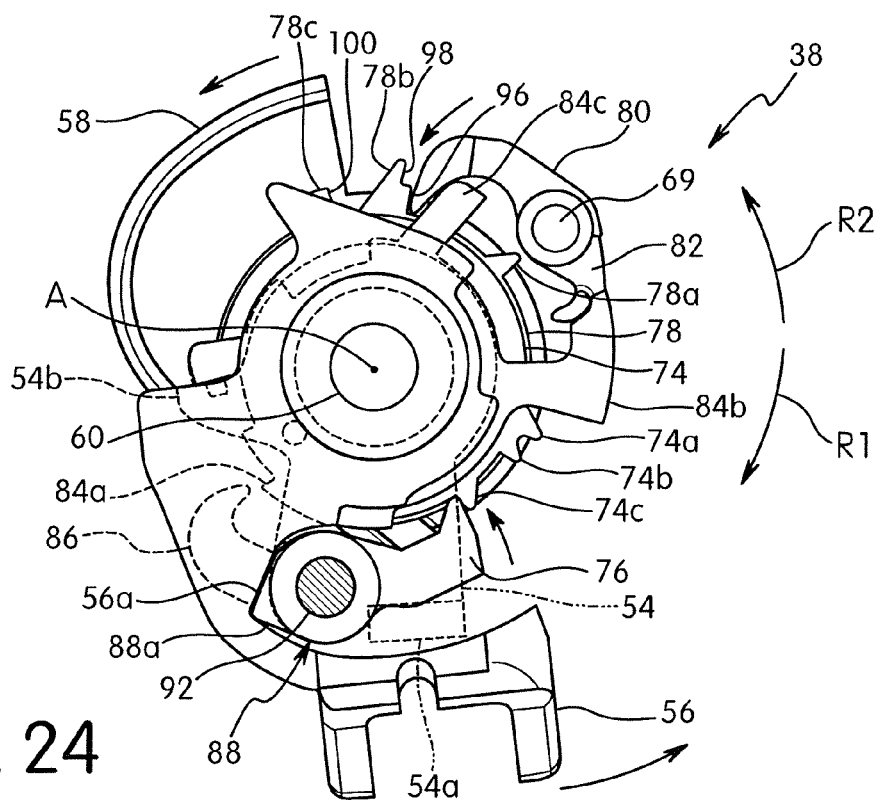
FIG. 24 is a front side view of the selected parts of the shift operating unit illustrated in FIGS. 19 to 23, but with the pull operating member being rotated to pull the inner wire such that the front derailleur is moved to the second top guiding position (the outermost position) with the chain remaining on the outer gear.

When the brake/shift lever 34 is released from the shifting position of FIG. 22, the first and second operating members 54 and 56 return to their rest positions as seen in FIG. 23 and the positioning ratchet 78 is engaged with the positioning pawl 80 to maintain the take-up member 58 in the first top guiding position T1. Now, another winding operation of the shift operating unit 38 can be performed by the rider pivotally moving the brake/shift lever 34 about the shift pivot axis P2 in the lateral inward direction towards the bicycle longitudinal center plane. Again, this pivotal movement of the brake/shift lever 34 is transmitted to the second operating member 56 via the connecting member 63 such that the second operating member 56 is rotated in the second rotational direction R2 from its rest position (FIG. 23) to its shifting position (FIG. 24). As the second operating member 56 rotates in the second rotational direction R2, the first abutment portion 56a of the second operating member 56 again contacts the second abutment portion 88a of the pawl member 88 to pivot the pulling pawl 76 into engagement with the second pull tooth 74b of the pulling ratchet 74. This engagement of the pulling pawl 76 with the first pull tooth 74a causes the pulling ratchet 74 to rotate in the second rotational direction R2. Rotation of the pulling ratchet 74 also results in the take-up member 58 and the positioning ratchet 78 to rotate together. Thus, the rotation of the positioning ratchet 78 results in the positioning pawl 80 engaging the first stop surface 96 of the positioning ratchet 78 to hold the take-up member 58 in the second top guiding position T2.

A cable releasing operation of the shift operating unit 38 will now be discussed with reference primarily to FIGS. 25 to 31. Cable releasing operations of the shift operating unit 38 are performed by the rider pivotally moving the shift lever 36 about the shift pivot axis P3 in the lateral inward direction towards the bicycle longitudinal center plane. The shift lever 36 is operated in a single progressive movement such that in the first operating member 54 moves in a single progressive movement in the second rotational direction R2 from one of the four shift or guiding positions L1, L2, T1 and T2 to the next adjacent shift or guiding position. FIGS. 25, 27, 29 and 31 illustrate the first operating member 54 in its rest position. FIGS. 26, 28 and 30 illustrate the first operating member 54 in its shifting position.

Figure 25:
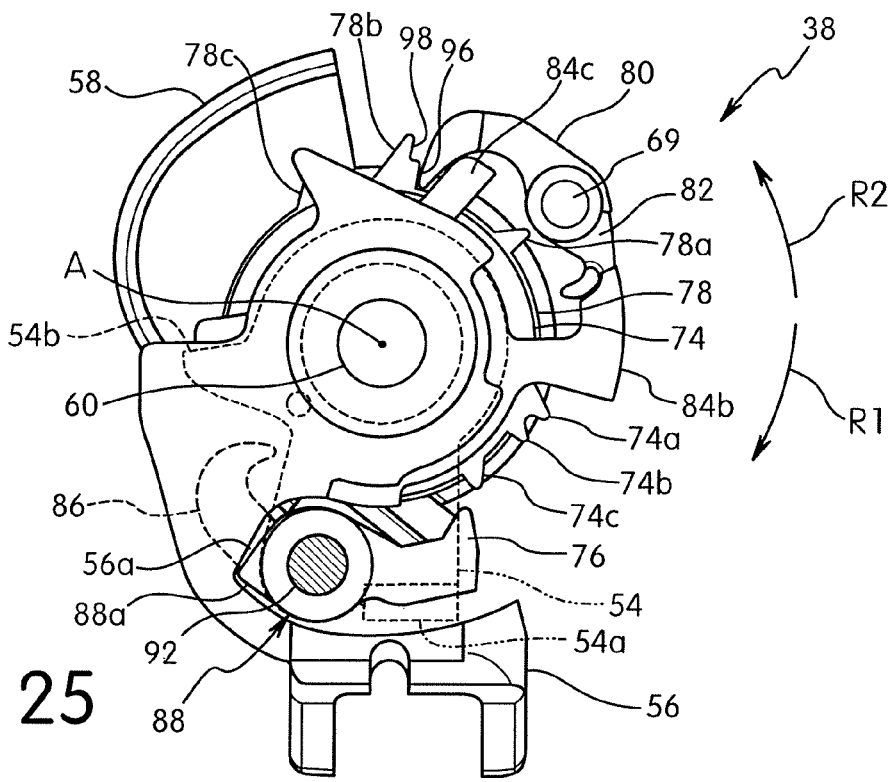
FIG. 25 is a front side view of the selected parts of the shift operating unit illustrated in FIGS. 19 to 24, but with the pull operating member being rotated from the shift operating position of FIG. 24 back to the rest position such that the front derailleur is held in the second top guiding position (the outermost position) with the chain remaining on the outer gear.
Figure 26:
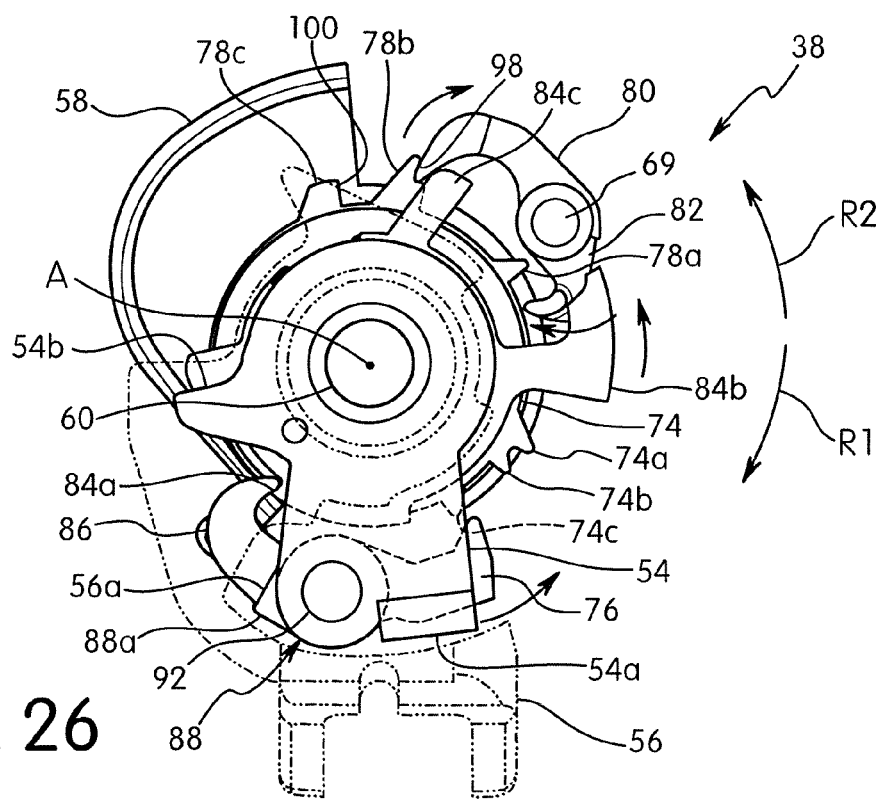
FIG. 26 is a front side view of the selected parts of the shift operating unit illustrated in FIGS. 19 to 25, but with the release operating member being rotated to release the inner wire such that the front derailleur is moved from the second top guiding position (the outermost position) to the first top guiding position (the second intermediate position) with the chain remaining on the outer gear.

As seen in FIG. 25, the shift operating unit 38 is in a fully wound position that corresponds to the second top guiding position T2 such that the positioning pawl 80 is contacting the first stop surface 96 of the positioning ratchet 78. As mentioned above, a cable releasing operation of the shift operating unit 38 is performed by the rider pivotally moving the shift lever 36. This pivotal movement of the shift lever 36 is transmitted to the first operating member 54 by the shift lever 36 contacting and pushing the contact flange 54a of the first operating member 54 such that the first operating member 54 is rotated in the second rotational direction R2 from its rest position (FIG. 25) to its shifting (releasing) position (FIG. 26).

As the first operating member 54 rotates in the second rotational direction R2 during a cable releasing operation of the shift operating unit 38, the release pawl 86 engages the operating tooth 84a of the release member 84 to move the release member 84 in response to the movement of the first operating member 54. This movement of the release member 84 causes the first pawl operating projection 84b to pivot the stopping pawl 82 towards the positioning ratchet 78. This movement of the release member 84 also causes the second pawl operating projection 84b to pivot the positioning pawl 80 away from the positioning ratchet 78 and out of engagement with the first stop surface 96 of the positioning ratchet 78. As a result, the take-up member 58, the pulling ratchet 74 and the positioning ratchet 78 rotate in the first rotational direction R1 under the force of the biasing element 62. However, the positioning pawl 80 engages the second stop surface 98 of the positioning ratchet 78 to stop the rotation of the take-up member 58, the pulling ratchet 74 and the positioning ratchet 78 such that the take-up member 58 is held in the first top guiding position T1.

Figure 27:
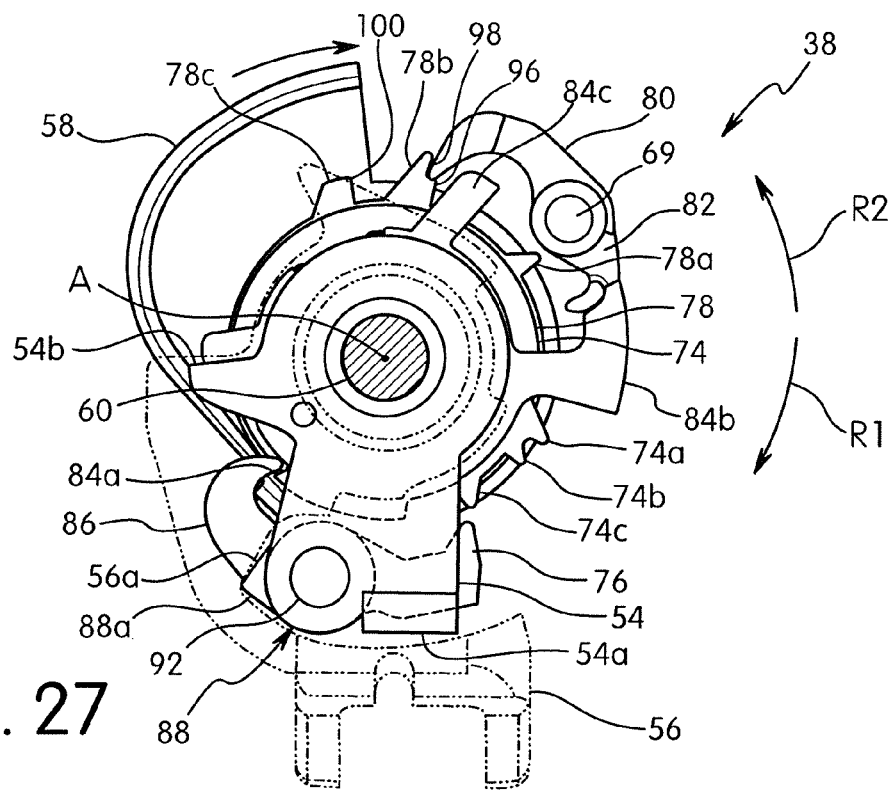
FIG. 27 is a front side view of the selected parts of the shift operating unit illustrated in FIGS. 19 to 26, but with the release operating member being rotated from the shift operating position of FIG. 26 back to the rest position such that the front derailleur is held in the first top guiding position (the second intermediate position) with the chain remaining on the outer gear.
Figure 28:
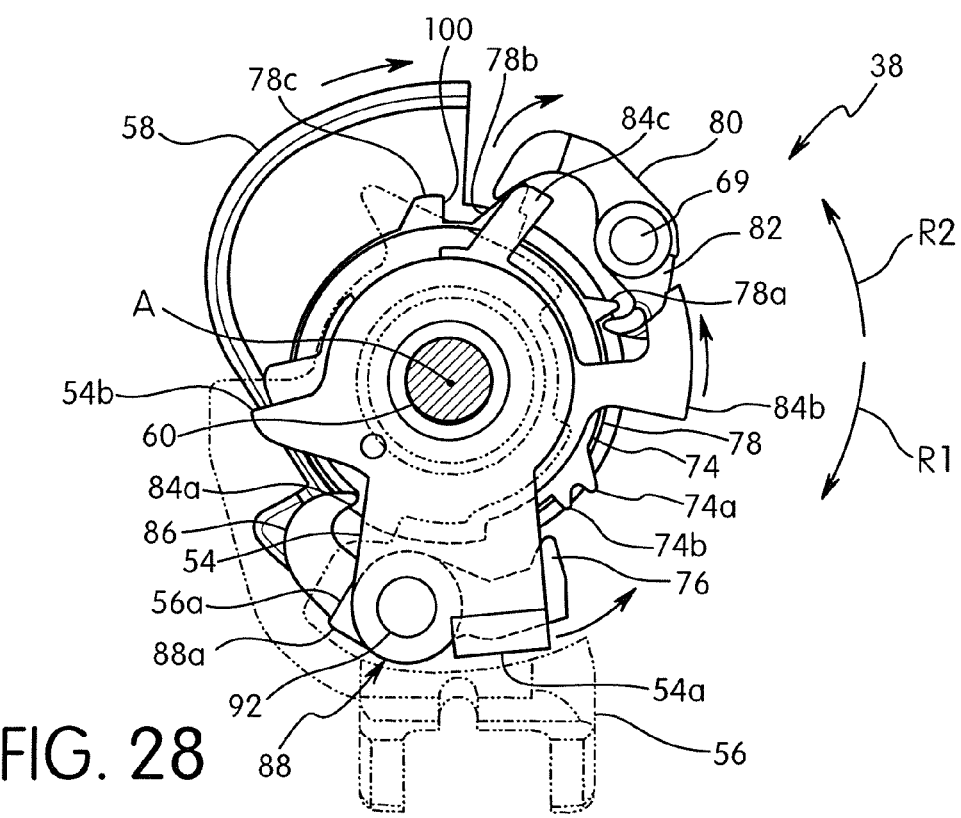
FIG. 28 is a front side view of the selected parts of the shift operating unit illustrated in FIGS. 19 to 27, but with the release operating member being rotated to release the inner wire such that the front derailleur is moved from the first top guiding position (the second intermediate position) to the first low guiding position (the first intermediate position) with the chain being shifted to the inner gear.

When the shift lever 36 is released from the shifting position of FIG. 26, the first operating member 54 returns to its rest position as seen in FIG. 27. As a result, the positioning ratchet 78 is engaged with the positioning pawl 80 to maintain the take-up member 58 in the first top guiding position T1. Now, another cable releasing operation of the shift operating unit 38 can be performed by the rider pivotally moving the shift lever 36 about the shift pivot axis P3 in the lateral inward direction towards the bicycle longitudinal center plane. Again, this pivotal movement of the shift lever 36 is transmitted to the first operating member 54 such that the first operating member 54 is rotated in the second rotational direction R2 from its rest position (FIG. 27) to its shifting position (FIG. 28). As the first operating member 54 rotates in the second rotational direction R2 during a cable releasing operation, the release pawl 86 engages the operating tooth 84a of the release member 84 to move the release member 84 in response to the movement of the first operating member 54. This movement of the release member 84 causes the first pawl operating projection 84b to first pivot the stopping pawl 82 towards the positioning ratchet 78 and then causes the second pawl operating projection 84b to pivot the positioning pawl 80 away from the positioning ratchet 78 and out of engagement with the second stop surface 98 of the positioning ratchet 78. Once the positioning pawl 80 disengages the second stop surface 98 of the positioning ratchet 78, the take-up member 58, the pulling ratchet 74 and the positioning ratchet 78 rotate in the first rotational direction R1 under the force of the biasing element 62. However, the stopping pawl 82 catches the stop tooth 78a, which stops the rotational movement of the take-up member 58, the pulling ratchet 74 and the positioning ratchet 78. As a result, the take-up member 58 is held in the first low guiding position L1.

Figure 29:
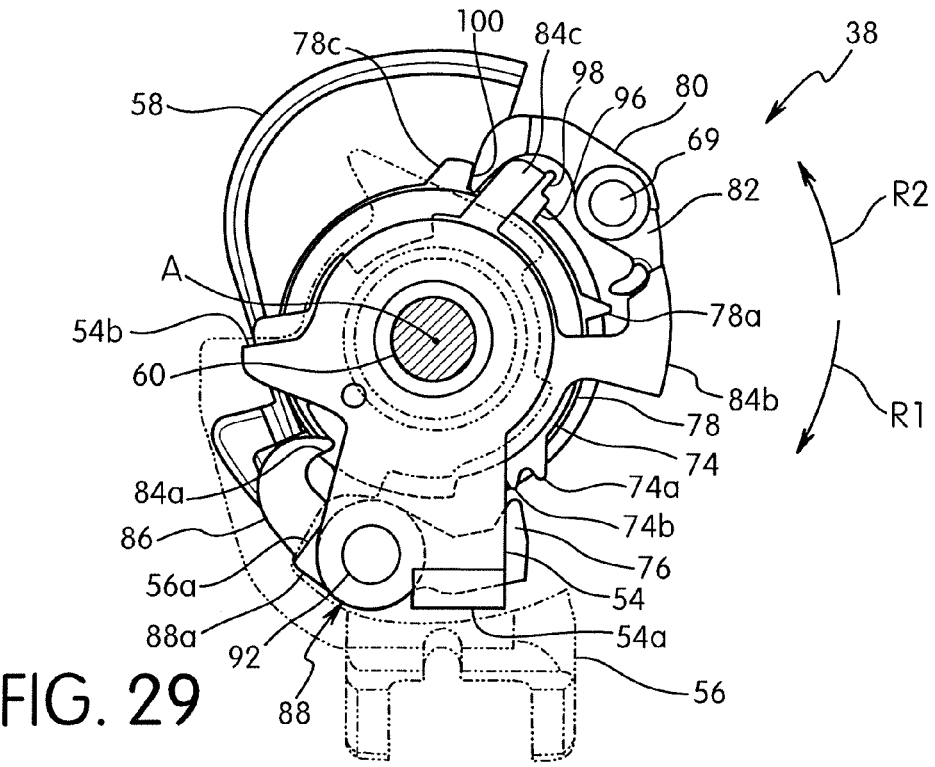
FIG. 29 is a front side view of the selected parts of the shift operating unit illustrated in FIGS. 19 to 28, but with the release operating member being rotated from the shift operating position of FIG. 28 back to the rest position such that the front derailleur is held in the first low guiding position (the first intermediate position) with the chain remaining on the inner gear.
Figure 30:
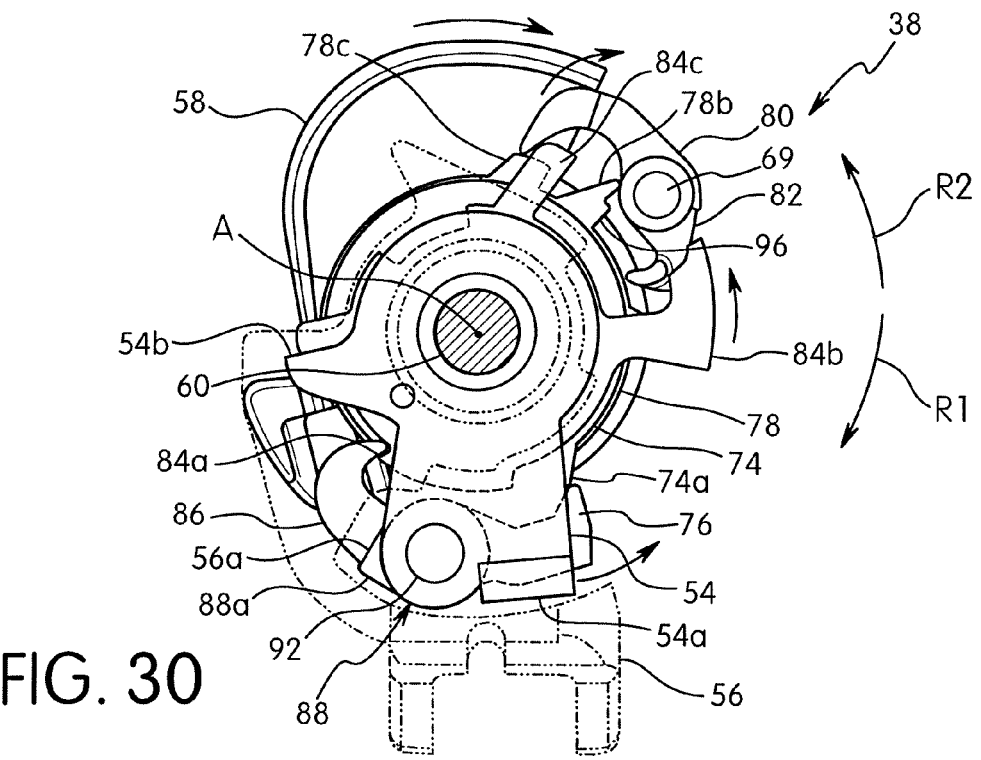
FIG. 30 is a front side view of the selected parts of the shift operating unit illustrated in FIGS. 19 to 29, but with the release operating member being rotated to release the inner wire such that the front derailleur is moved from the first low guiding position (the first intermediate position) to the second low guiding position (the innermost position) with the chain remaining on the inner gear.
Figure 31:
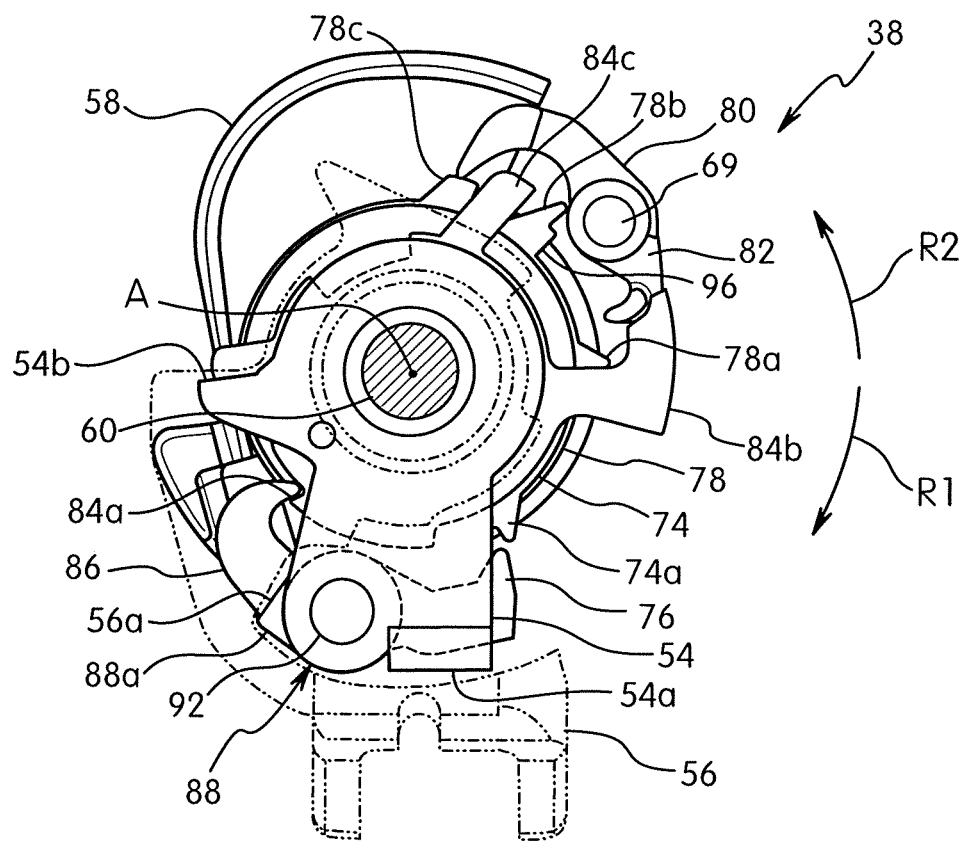
FIG. 31 is a front side view of the selected parts of the shift operating unit illustrated in FIGS. 19 to 30, but with the release operating member being rotated from the shift operating position of FIG. 30 back to the rest position such that the front derailleur is held in the second low guiding position (the innermost position) with the chain remaining on the inner gear.

When the shift lever 36 is released from the shifting position of FIG. 28, the first operating member 54 returns to its rest position as seen in FIG. 29. As a result, the positioning ratchet 78 is engaged with the positioning pawl 80 to maintain the take-up member 58 in the first low guiding position L1. Now, another cable releasing operation of the shift operating unit 38 can be performed by the rider pivotally moving the shift lever 36 about the shift pivot axis P3 in the lateral inward direction towards the bicycle longitudinal center plane. Again, this pivotal movement of the shift lever 36 is transmitted to the first operating member 54 such that the first operating member 54 is rotated in the second rotational direction R2 from its rest position (FIG. 29) to its shifting position (FIG. 30). As the first operating member 54 rotates in the second rotational direction R2 during a cable releasing operation, the release pawl 86 engages the operating tooth 84a of the release member 84 to move the release member 84 in response to the movement of the first operating member 54. This movement of the release member 84 causes the first pawl operating projection 84b to first pivot the stopping pawl 82 towards the positioning ratchet 78 and then causes the second pawl operating projection 84b to pivot the positioning pawl 80 away from the positioning ratchet 78 and out of engagement with the third stop surface 100 of the positioning ratchet 78. Once the positioning pawl 80 disengages the third stop surface 100 of the positioning ratchet 78, the take-up member 58, the pulling ratchet 74 and the positioning ratchet 78 rotate in the first rotational direction R1 under the force of the biasing element 62 to the second low guiding position L2 as seen in FIG. 31.

Figure 32:
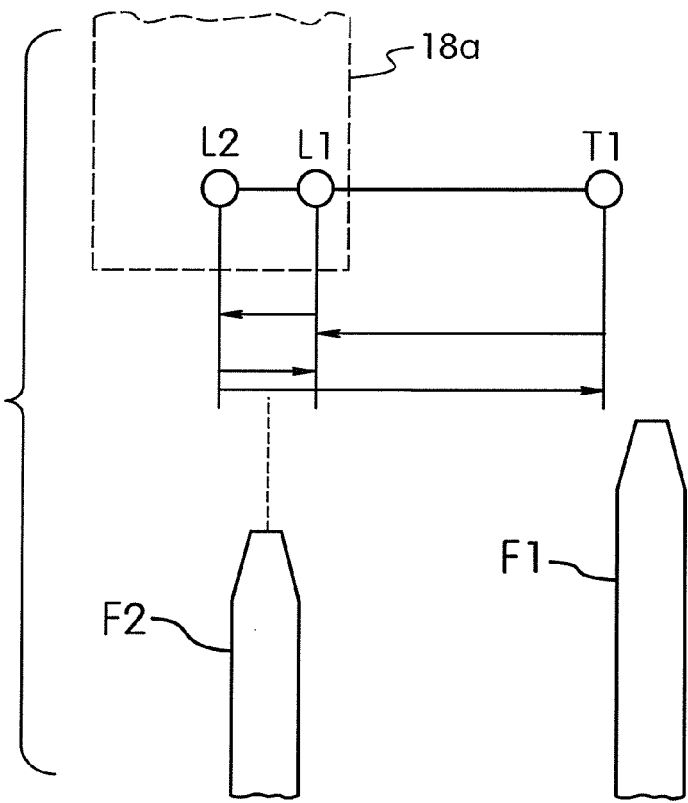
FIG. 32 is a schematic diagram illustrating various guiding positions for the chain guide of the front derailleur resulting by operating a first alternative shift operating device.

Referring now to FIG. 32, a schematic diagram is illustrated showing various guiding positions for the chain guide 18a of the front derailleur 18b that can be obtained by operating a first alternative shift operating device (not shown). In this first alternative shift operating device, basically, the shift operating unit 38 can be modified to eliminate the second top guiding position T2. In other words, it will be apparent to those skilled in the bicycle field from reading this disclosure that the shift operating unit 38 can be modified to have just three guiding positions.

Figure 33:
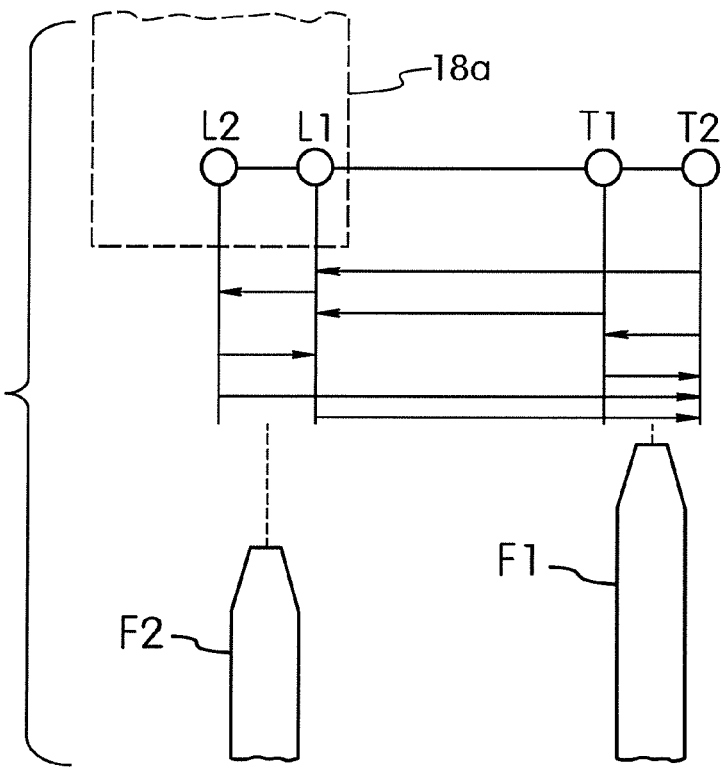
FIG. 33 is a schematic diagram illustrating various guiding positions for the chain guide of the front derailleur resulting by operating a second alternative shift operating device.

Referring now to FIG. 33, a schematic diagram is illustrated showing various guiding positions for the chain guide 18a of the front derailleur 18b that can be obtained by operating a second alternative shift operating device (not shown). In this second alternative shift operating device, basically, the shift operating unit 38 can be modified such that during a cable pulling operation from either of the first and second low guiding positions L1 and L2, the chain guide 18a by passes the second top guiding position T2 and moves directly to the second top guiding position T2 from either of the first and second low guiding positions L1 and L2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below", "inner", "outer" and "transverse" as well as any other similar directional terms refer to those directions of a bicycle equipped with the bicycle shift operating device on a flat horizontal surface. Accordingly, these terms, as utilized to describe the bicycle shift operating device should be interpreted relative to a bicycle equipped with the bicycle shift operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shift operating device for operating a shifting device that selectively moves a chain between a first gear having a first diameter and a second gear having a second diameter that is smaller than the first diameter of the first gear using a guiding portion, the bicycle shift operating device comprising:
    an operating member;
    a moving member configured to be connected to the shifting device by a connecting member; and
    a positioning mechanism selectively maintaining the moving member in any one of a first position that locates the guiding portion to a first guiding position where the chain corresponds to the first gear, a second position that locates the guiding portion to a second guiding position where the chain corresponds to the second gear, and a third position that locates the guiding portion to a third guiding position where the chain corresponds to the second gear, the third guiding position being farther from the first guiding position than the second guiding position,
    the positioning mechanism being configured such that the moving member moves in a first direction from the first position to the second position in response to a single operation of the operating member,
    the positioning mechanism being absent any position maintaining structure that maintains a position of the moving member between the first position and the second position.

2. The bicycle shift operating device according to claim 1, wherein
    the positioning mechanism is further configured such that the moving member moves a first moving amount from the first position to the second position and moves a second moving amount from the second position to the third position, the first moving amount being larger than the second moving amount.

3. The bicycle shift operating device according to claim 2, wherein
    the positioning mechanism is further configured such that the second moving amount of the moving member is less than one-half of the first moving amount of the moving member.

4. The bicycle shift operating device according to claim 1, wherein
    the operating member includes a user operated lever.

5. The bicycle shift operating device according to claim 1, wherein
    the moving member includes a winding member.

6. The bicycle shift operating device according to claim 5, wherein
    the connecting member includes a shift wire, and
    the moving member includes a shift wire attachment structure that is configured to be connected the shift wire.

7. The bicycle shift operating device according to claim 5, wherein
    the positioning mechanism includes a positioning member that rotates with the winding member, and a stopping pawl that engages a stop tooth of the positioning member during rotation of the positioning member in the first direction from the first position to the second position such that the positioning member and the winding member both stop in a position between the first position and the second position.

8. The bicycle shift operating device according to claim 7, wherein
    the positioning mechanism further includes a positioning pawl that engages a first positioning tooth of the positioning member while the winding member is in the first position, and that engages a second positioning tooth of the positioning member white the winding member is in the second position.

9. The bicycle shift operating device according to claim 8, wherein
    the positioning pawl and the stopping pawl move independently with respect to each other such that the positioning pawl moves between a holding position that is engaged with one of the first and second positioning teeth and a non-holding position that is disengaged from the first and second positioning teeth, and such that the stopping pawl moves between a non-stop position that is disengaged from the stop tooth and a stop position that is engaged with the stop tooth.

10. The bicycle shift operating device according to claim 1, further comprising
    an additional operating member operatively coupled to the positioning mechanism such that the additional operating member rotates the moving member in a second direction, which is opposite to the first direction, from the second position to the first position in response to a single operation of the additional operating member.

11. The bicycle shift operating device according to claim 1, wherein
    the positioning mechanism is further configured such that the moving member is further selectively maintained by the positioning mechanism in a fourth position that locates the guiding portion to a fourth guiding position where the chain corresponds to the first gear, the fourth guiding position being farther from the second guiding position than the first guiding position.

12. A bicycle driving system comprising:

a gear assembly at least including a first gear having a first diameter and a second gear having a second diameter that is smaller than the first diameter of the first gear;

a shifting device including a guiding portion that is configured to selectively move a chain between the first gear and the second gear; and a bicycle shift operating device operatively coupled to the shifting device the bicycle shift operating device including an operating member, a moving member configured to be connected to the shifting device by a connecting member, and a positioning mechanism selectively maintaining the moving member in any one of a first position that locates the guiding portion to a first guiding position where the chain corresponds to the first gear, a second position that locates the guiding portion to a second guiding position where the chain corresponds to the second gear, and a third position that locates the guiding portion to a third guiding position where the chain corresponds to the second gear, the third guiding position being farther from the first guiding position than the second guiding position, the positioning mechanism being configured such that the moving member moves in a first direction from the first position to the second position in response to a single operation of the operating member, the positioning mechanism being absent any position maintaining structure that maintains a position of the moving member between the first position and the second position.

13. The bicycle driving system according to claim 12, wherein the positioning mechanism is further configured such that the moving member moves a first moving amount from the first position to the second position and moves a second amount from the second position to the third position, the first moving amount being larger than the second amount.

14. The bicycle driving system according to claim 13, wherein the positioning mechanism is further configured such that the second moving amount of the moving member is less than one-half of the first moving amount of the moving member.

15. The bicycle driving system according to claim 12, wherein the operating member includes a user operated lever.

16. The bicycle driving system according to claim 12, wherein the moving member includes a winding member.

17. The bicycle driving system according to claim 16, wherein the connecting member includes a shift wire, and the moving member includes a shift wire attachment structure that is configured to be connected the shift wire.

18. The bicycle driving system according to claim 16, wherein the positioning mechanism includes a positioning member that rotates with the winding member, and a stopping pawl that engages a stop tooth of the positioning member during rotation of the positioning member in the first direction from the first position to the second position such that the positioning member and the winding member both stop in a position between the first position and the second position.

19. The bicycle driving system according to claim 18, wherein the positioning mechanism further includes a positioning pawl that engages a first positioning tooth of the positioning member while the winding member is in the first position, and that engages a second positioning tooth of the positioning member while the winding member is in the second position.

20. The bicycle driving system according to claim 19, wherein the positioning pawl and the stopping pawl move independently with respect to each other such that the positioning pawl moves between a holding position that is engaged with one of the first and second positioning teeth and a non-holding position that is disengaged from the first and second positioning teeth, and such that the stopping pawl moves between a non-stop position that is disengaged from the stop tooth and a stop position that is engaged with the stop tooth.

21. The bicycle driving system according to claim 12, further comprising an additional operating member operatively coupled to the positioning mechanism such that the additional operating member rotates the moving member in a second direction, which is opposite to the first direction, from the second position to the first position in response to a single operation of the additional operating member.

22. The bicycle driving system according to claim 12, wherein the positioning mechanism is further configured such that the moving member is further selectively maintained by the positioning mechanism in a fourth position that locates the guiding portion to a fourth guiding position where the chain corresponds to the first gear, the fourth guiding position being farther from the second guiding position than the first guiding position.

* * * * *